(12) United States Patent
Choi et al.

(10) Patent No.: US 11,630,832 B2
(45) Date of Patent: Apr. 18, 2023

(54) DYNAMIC ADMISSION CONTROL FOR DATABASE REQUESTS

(71) Applicant: SAP SE, Walldorf (DE)

(72) Inventors: Jaeyoung Choi, Seoul (KR); Chul Won Lee, Seoul (KR); Jeong Hee Won, Yongin (KR); Norman May, Karlsruhe (DE)

(73) Assignee: SAP SE, Walldorf (DE)

( * ) Notice: Subject to any disclaimer, the term of this patent is extended or adjusted under 35 U.S.C. 154(b) by 1044 days.

(21) Appl. No.: 15/616,567

(22) Filed: Jun. 7, 2017

(65) Prior Publication Data
US 2018/0357291 A1 Dec. 13, 2018

(51) Int. Cl.
*G06F 16/00* (2019.01)
*G06F 7/00* (2006.01)
*G06F 16/25* (2019.01)
*G06F 16/23* (2019.01)

(52) U.S. Cl.
CPC ........ *G06F 16/254* (2019.01); *G06F 16/2379* (2019.01); *G06F 16/25* (2019.01)

(58) Field of Classification Search
CPC ............... G06F 16/254; G06F 16/2453; G06F 16/2379; G06F 16/25
USPC ........................................................ 707/602
See application file for complete search history.

(56) References Cited

U.S. PATENT DOCUMENTS

| 7,640,249 | B2 | 12/2009 | Smits | |
|---|---|---|---|---|
| 7,958,159 | B1 | 6/2011 | Tran et al. | |
| 10,324,758 | B1* | 6/2019 | Devarakonda | G06F 9/4887 |
| 10,423,644 | B1 | 9/2019 | Leach et al. | |
| 11,068,506 | B2 | 7/2021 | Lee et al. | |
| 2010/0153963 | A1* | 6/2010 | Kakarlamudi | G06F 16/217 |
| | | | | 707/E17.014 |
| 2012/0278293 | A1* | 11/2012 | Bulkowski | G06F 16/27 |
| | | | | 707/703 |
| 2013/0339636 | A1* | 12/2013 | Lee | G06F 3/0611 |
| | | | | 711/154 |
| 2014/0101091 | A1 | 4/2014 | Brown et al. | |
| 2015/0149745 | A1 | 5/2015 | Eble et al. | |

(Continued)

OTHER PUBLICATIONS

"An insight into SAP HANA Architecture", *SapHanaTutorial*, <http://saphanatutorial.com/an-insight-into-sap-hana-architecture/> (retrieved Apr. 7, 2016).

(Continued)

*Primary Examiner* — Raquel Perez-Arroyo
(74) *Attorney, Agent, or Firm* — Klarquist Sparkman, LLP

(57) ABSTRACT

Technologies are described for facilitating the processing of requests for database operations within a database environment that includes one or more processing units and a memory. A utilization level of one or more computing resources of a database system is periodically determined. When a request for a database operation is received from a database client, it is determined, such as based on the utilization level, whether the database system has sufficient resources to process the request. If the database system does not have sufficient resources to process the request, the request is enqueued in a request queue for deferred execution. If it is later determined that the database system has sufficient resources to execute the request, the request can be dequeued, executed, and execution results returned to the database client.

20 Claims, 15 Drawing Sheets

(56) References Cited

U.S. PATENT DOCUMENTS

| | | | |
|---|---|---|---|
| 2015/0379077 A1 | 12/2015 | Grosse et al. | |
| 2016/0048584 A1 | 2/2016 | Valentin | |
| 2016/0171070 A1* | 6/2016 | Hrle | G06F 16/2379 707/615 |
| 2016/0196163 A1 | 7/2016 | Guilk et al. | |
| 2016/0203050 A1 | 7/2016 | Hrle et al. | |
| 2016/0253403 A1 | 9/2016 | Marin | |
| 2017/0329835 A1 | 11/2017 | Lee et al. | |
| 2017/0329836 A1 | 11/2017 | Simitsis et al. | |
| 2018/0039674 A1 | 2/2018 | Seyvet et al. | |

OTHER PUBLICATIONS

Kemper et al., "CH-benCHmark", *Technische Universitat Munchen*, <https://db.in.tum.de/research/projects/CHbenCHmark/> (retrieved Mar. 28, 2016).

Farber et al., "The SAP HANA Database—An Architecture Overview", *IEEE Computer Society, Bulletin of the Technical Committee of Data Engineering*, 35(1):28-33 (Mar. 2012).

Vasudevan, Sabarish, "OLAP vs OLTP", *Basisdomain*, <https://basisdomain.wordpress.com/2013/03/26/olap-vs-oltp/> (retrieved Mar. 28, 2016), Mar. 26, 2013.

"CPU Scheduling," retrieved from http://www.cs.odu.edu/~cs471w/spring17/lectures/Scheduling.htm, on or before May 2017, 7 pages.

"Why Too Many Threads Hurts Performance, and What to do About it," retrieved from http://www.codeguru.com/cpp/sample_chapter/article.php/c13533/Why-Too-Many-Threads-Hurts-Performance-and-What-to-do-About-It.htm, on or before May 2017, 8 pages.

Akhter, et al., "Avoiding Classic Threading Problems," retrieved from http://www.drdobbs.com/tools/avoiding-classic-threading-problems/23100049, on or before May 2017, 6 pages.

"CPU Work load optimization in SAP HANA," retrieved from https://archive.sap.com/discussions/thread/3579240, on or before May 2017, 2 pages.

"Operating Systems," retrieved from http://homepage.cs.uri.edu/book/operating_systems/operating_systems.htm, on or before May 2017, 8 pages.

"Process state," retrieved from https://en.wikipedia.org/wiki/Process_state, on or before May 2017, 4 pages.

"Unexpectedly Long Loads or Queries," retrieved from https://help.sap.com/doc/saphelp_iq1610_iqdb/16.0.10/en-US/a7/6a03c384f21015aa07b1831ba75536/frameset.htm, on or before May 2017, 1 page.

Mankala, Chandrasekhar, "SAP HANA Architecture," retrieved from https://www.packtpub.com/books/content/sap-hana-architecture, on or before May 2017, 7 pages.

"Thrashing (computer science)," retrieved from https://en.wikipedia.org/wiki/Thrashing_(computer science), on or before May 2017, 3 pages.

Toussi, Fred, "Chapter 3. Sessions and Transactions," retrieved from http://hsqldb.org/doc/guide/sessions-chapt.html, on or before May 2017, 11 pages.

"Monitoring SAP HANA Database server," retrieved from https://www.eginnovations.com/Docs/eG%20Measurements%20Manuals/Monitoring%20SAP%20HANA%20Database%20server, on or before May 2017, 41 pages.

"EWMA chart," retrieved from https://en.wikipedia.org/wiki/EWMA_chart, on or before May 2017, 2 pages.

"Moving-average model," retrieved from https://en.wikipedia.org/wiki/Moving-average_model, on or before May 2017, 3 pages.

Patricio, Anthony, "Sessions and transactions," retrieved from https://developer.jboss.org/wiki/SessionsAndTransactions?_sscc=t, on or before May 2017, 10 pages.

"What is a database session?" retrieved from https://stackoverflow.com/questions/10521947/what-is-a-database-session, on or before May 2017, 3 pages.

"SAP HANA—SQL Session Management Statements," retrieved from http://www.sapstudent.com/hana/sap-hana-sql-session-management-statements, on or before May 2017, 6 pages.

Non-Final Office Action received in U.S. Appl. No. 15/150,815, dated May 10, 2018, 23 pages.

Response to Non-Final OA for U.S. Appl. No. 15/150,815, dated Aug. 1, 2018, 17 pages.

Final Office Action received in U.S. Appl. No. 15/150,815, dated Oct. 29, 2018, 26 pages.

Amendment Filed with RCE for U.S. Appl. No. 15/150,815, dated Jan. 25, 2019, 10 pages.

Non-Final Office Action received in U.S. Appl. No. 15/150,815, dated Aug. 8, 2019, 35 pages.

Response to Non-Final OA for U.S. Appl. No. 15/150,815, dated Nov. 1, 2019, 11 pages.

Final Office Action received in U.S. Appl. No. 15/150,815, dated Feb. 3, 2020, 40 pages.

Amendment Filed with RCE for U.S. Appl. No. 15/150,815, dated Nov. 2, 2020, 18 pages.

Non-Final Office Action received in U.S. Appl. No. 15/150,815, dated Nov. 24, 2020, 17 pages.

Response to Non-Final OA for U.S. Appl. No. 15/150,815, dated Feb. 19, 2021, 17 pages.

Notice of Allowance received in U.S. Appl. No. 15/150,815, dated Mar. 16, 2021, 27 pages.

Notice of Appeal filed in U.S. Appl. No. 15/150,815, filed Apr. 29, 2020, 2 pages.

Appeal Brief filed in U.S. Appl. No. 15/150,815, dated Jun. 16, 2020, 18 pages.

Examiner's Answer received in U.S. Appl. No. 15/150,815, dated Sep. 3, 2020, 17 pages.

\* cited by examiner

DYNAMIC ADMISSION CONTROL FOR DATABASE REQUESTS

FIELD

The present disclosure generally relates to processing workload elements, such as requests for database operations, in a database environment. Particular implementations relate to queuing requests for database operations when database resources are at a specified level.

BACKGROUND

Increasingly, single database systems are used to simultaneously process online transaction processing (OLTP) requests needed for business operations and online analytical processing (OLAP) requests related to data analysis and business planning. While OLTP requests typically execute quickly, OLAP requests can take much longer to complete. If too many system resources are used processing OLAP requests, the execution time of OLTP requests can be significantly affected, which, apart from affecting database performance, can practically affect the operation of a business. This situation may occur even though the load on the processors of the database system may be comparatively low.

Additionally, admitting too many requests to the database system can cause the processors, or memory, of the database system to become overloaded. The processing time for database requests may greatly increase, and the execution of higher priority OLTP requests may be delayed because too many resources are being used for longer-running OLAP requests. Thus, room for improvement remains in scheduling database workloads.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the processing of requests for database operations, including reducing the possibility of a database system becoming overloaded, or prioritizing certain types of requests for database operation. In one aspect, a first use level is determined for at least one computing resource, such as memory or one or more processors. A first request for a database operation is received from a database client. The first use level is compared with a first threshold value. The first request is enqueued in a request queue.

In another aspect, a resource use level for one or more computing resources, such as a memory or one or more processors, is periodically determined. A request for a database operation is received from a database client. It is determined that the request is eligible for deferred execution. It is determined that the computing system does not have sufficient resources to execute the request, such as based on the determined resource use level. The request is enqueued in a request queue for deferred execution.

In a further aspect, a first computing resource level is determined that includes at least one of a memory use level and a processor use level. A request for a database operation is received from a database client. The first computing resource level is compared with a queuing range. It is determined that the first computing resource level is within the queuing range, and the request is enqueued in a request queue.

A second computing resource level is determined that includes at least one of a memory use level and a processor use level. The second computing resource level is compared with a threshold value. It is determined that the computing system has sufficient resources to execute the request. The request is dequeued and executed. Execution results are returned to the database client.

The present disclosure also includes computing systems and tangible, non-transitory computer readable storage media configure to carry out, or including instructions for carrying out, an above-described method. As described herein, a variety of other features and advantages can be incorporated into the technologies as desired.

DETAILED DESCRIPTION

Example 1

Overview

Figure 1:
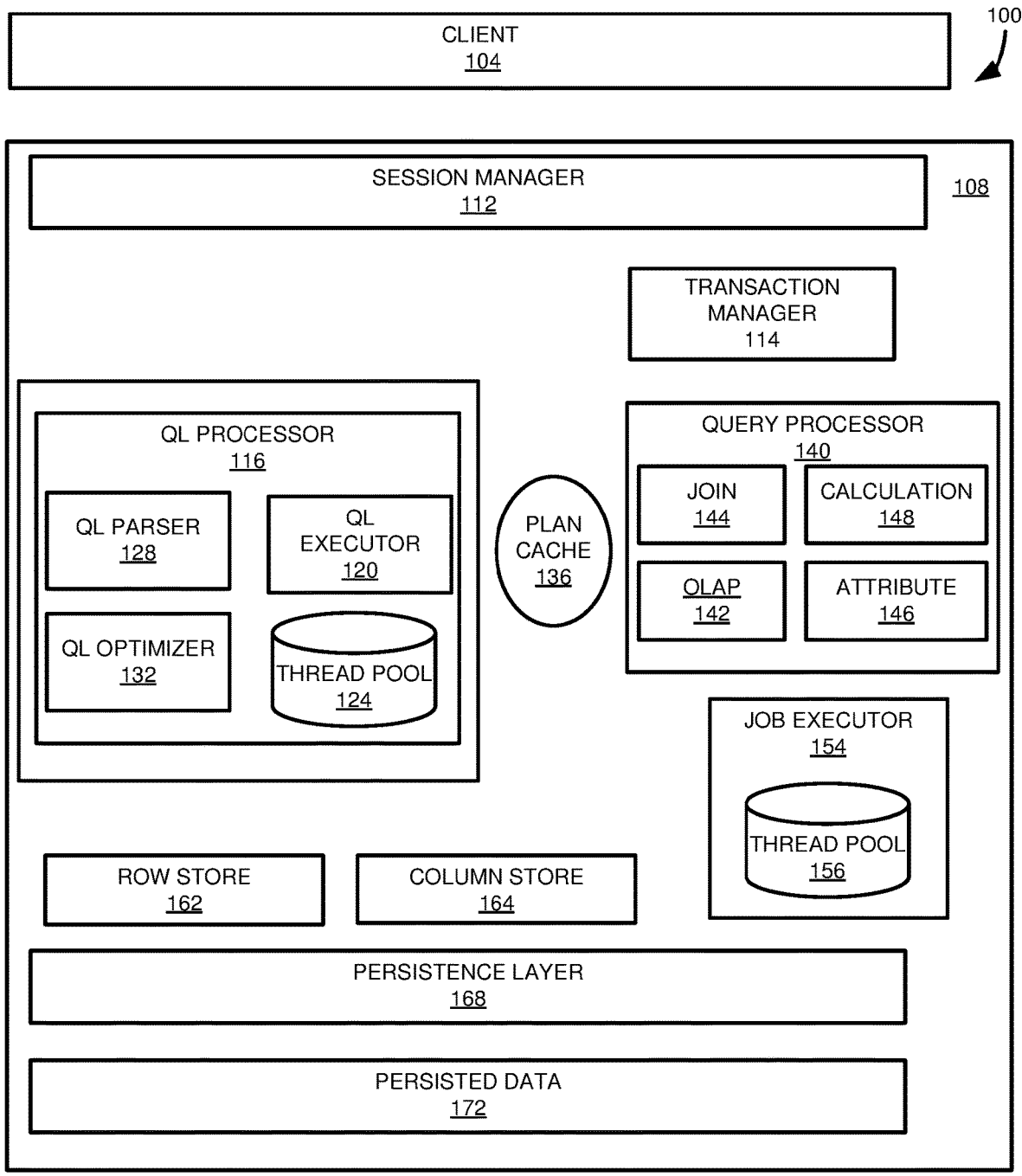
FIG. 1 is a diagram depicting a database environment having one or more clients and a database server in which at least certain implementations of a disclosed database request processing method may be used.

Database systems commonly operate with online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers. Because OLAP processes can involve complex analysis of a large number of records, they can require significant processing time, even if the load on the processors of the database system is comparatively low.

Modern database systems often provide the ability to perform both OLTP and OLAP operations concurrently on a single system. While this can be beneficial for users, and may reduce maintenance efforts compared with maintaining multiple systems, mixed OLTP and OLAP workloads can affect performance of the database system. For example, OLAP workloads can delay processing of OLTP transactions, which can impact response time, and ultimately business operations.

Additionally, admitting too many requests to the database system can cause the processors, or memory, on the database system to become overloaded. For example, at least certain issues arising from servicing mixed OLTP/OLAP workloads can be ameliorated by delegating at least some OLAP workloads to a different thread pool than a pool of threads used primarily for OLTP workloads. Although OLTP requests may not be delayed because of the unavailability of threads to service them, if utilization of system resources (e.g., CPU or memory resources) is high, the processing time for both OLTP and OLAP database requests may greatly increase.

In particular, the execution of higher priority OLTP requests may be delayed because too many resources are being used for longer-running OLAP requests. Among problems that can result from a large number of threads is overhead involved in saving and restoring the register and cache states when threads are swapped at a CPU core. In addition, if a thread acquires a lock and is not able to release the lock for a long period of time because of its limited CPU time, another thread waiting for the same resource may be also be kept waiting for a long period of time. The increased duration of lock holds may also increase the chances for deadlocks to arise. Thus, room for improvement remains in scheduling database workloads.

The present disclosure provides innovations in the scheduling and processing of database requests that can help reduce the chances of database resources, such as processors or memory, from becoming overloaded. Briefly, a component of the database system can monitor resources of the database system. When a request for a database operation (e.g., a query, a data manipulation language (DML) statement, a transaction control command, etc.) is received, based on the current resource usage data for the system, and optionally the nature of the request, it can be determined whether the system has enough available resources to process the request. If the system does not have enough resources to immediately process the request, the request can be added to a request queue. A database system component can periodically review the resource utilization of the database system, and if the database system has sufficient resources available, dequeue one or more requests for processing. In some aspects, a queue may be full, or the system may otherwise not have enough resources to process a request. In such cases, rather than being executed or queued, the request can be rejected or terminated, and an appropriate notice returned to the database client.

In some cases, a database client (e.g., a user or an application) may need the request for a database operation to be executed within a particular time frame. Or, the database system itself may include a threshold time after which the request is assumed to be stale, and can be cancelled. Accordingly, a database system component can periodically analyze queued requests to determine whether the time the request has been pending exceeds a time set for the request (e.g., by a database client) or a system-specified time limit. If the time limit has been exceeded, the request can be dequeued, terminated, and a notification sent to the database client. If the time limit has not been exceeded, the request can be left in the queue.

As mentioned above, in at least some embodiments, the nature of a request can be used to help determine whether an incoming request should be processed, queued, or rejected. The nature of the request can also be used to determine whether it, and possibly other requests, should be dequeued. The nature of the request can be related to the projected execution time associated with the request. In some cases, the projected execution time can be determined by analyzing other requests by the same database client (including within the same database session), statistics associated with the request (e.g., statistics for a query plan), or by analyzing the operations needed to execute the request.

The disclosed innovations in the handling of requests for database operations can be used in conjunction with other workload dispatching techniques to improve the operation of a database system. For example, certain queries (e.g., for OLAP requests) can require significant processing time. In some cases, such queries can be delegated from a thread of a first thread pool to a thread of a second thread pool, where the delegating frees the thread of the first thread pool to handle other incoming requests. In a particular implementation, this delegation analysis is applied to requests received when system resources are sufficiently available that the request is not subject to queuing.

The disclosed innovations can provide improvements in the processing of requests for database operations, as well as improving the functioning of one or more computer devices implementing a database system. By avoiding overload situations, the disclosed innovations can improve the throughput, turnaround time, and response time for database requests. The disclosed innovations can also help ensure that the processing of higher priority database requests, such as OLTP requests, is not overly affected by the processing of longer-running requests, such as OLAP requests. The disclosed innovations can result in more efficient CPU utilization, reduce the number of thread and process context switches, and reduce cache swapping.

Example 2

Example Database Environment

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 108. Through various subcomponents, the database server 108 can process requests for database operations, such as requests to store, read, or manipulate data. A session manager component 112 can be responsible for managing connections between the client 104 and the database server 108. Typically, the session manager 112 can simultaneously manage connections with multiple clients 104.

The session manager 112 can carry out functions such as creating a new session for a client request, assigning a client request to an existing session, and authenticating access to the database server 108. For each session, the session manager 112 can maintain a context that stores a set of parameters related to the session, such as settings related to committing database transactions or the transaction isolation level (such as statement level isolation or transaction level isolation). Once a connection is established between the client 104 and the database server 108, the clients usually communicates with the database server using a query language, such as the structured query language (SQL).

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 108.

The session manager 112 can communicate with a query language processor 116, such as a structured query language processor. For example, the session manager 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 108. For example, transaction control statements (such as commit or rollback operations) can be forwarded by the query language processor 116 to the transaction manager 114. In at least some cases, the query language processor 116 is responsible for carrying out operations that manipulate data (e.g., SELECT, UPDATE, DELETE). Other types of operations, such as queries, can be sent by the query language processor 116 to other components of the database server 108.

When a connection is established between the client 104 and the database server 108 by the session manager 112, the session manger can assign a client request, such as a query, to a thread of the thread pool 124. In at least one implementation, a thread is a context for executing a processing activity. The thread can be managed by an operating system of the database server 108, or by, or in combination with, another component of the database server. Typically, at any point, the thread pool 124 contains a plurality of threads. In at least some cases, the number of threads in the thread pool 124 can be dynamically adjusted, such in response to a level of activity at the database server 108. Each thread of the thread pool 124, in particular aspects, can be assigned to a plurality of different sessions.

When a query is received, the session manager 112 can determine whether an execution plan for the query already exists, such as in a plan cache 136. If a query execution plan exists, the cached execution plan can be retrieved and forwarded to the query language executor 120, such as to an execution thread of the thread pool 124 determined by the session manager 112. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 108.

The query can also be optimized using a query language optimizer 132. The query language optimizer 132 can manipulate elements of the query language statement to allow the query to be processed more efficiently. For example, the query language optimizer 132 may perform operations such as un-nesting queries or determining an optimized execution order for various operations in the query, such as operations within a statement. After optimization, an execution plan can be generated for the query. In at least some cases, the execution plan can be cached, such as in the plan cache 136, which can be retrieved (such as by the session manager 112) if the query is received again.

Once a query execution plan has been generated or received, the query language executor 120 can oversee the execution of an execution plan for the query. For example, the query language executor 120 can invoke appropriate subcomponents of the database server 108.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally-parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 108, but can improve execution time of the query.

The query processing engines of the query processor 140 can access data stored in the database server 108. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, for at least for certain types of operations (such a join, merge, and subquery), both the row store 162 and the column store 164.

A persistence layer 168 can be in communication with the row store 162 and the column store 164. The persistence layer 168 can be responsible for actions such as persisting committed write transactions, storing redo log entries, rolling back transactions, and periodically writing data to storage to provide persisted data 172.

Figure 2:
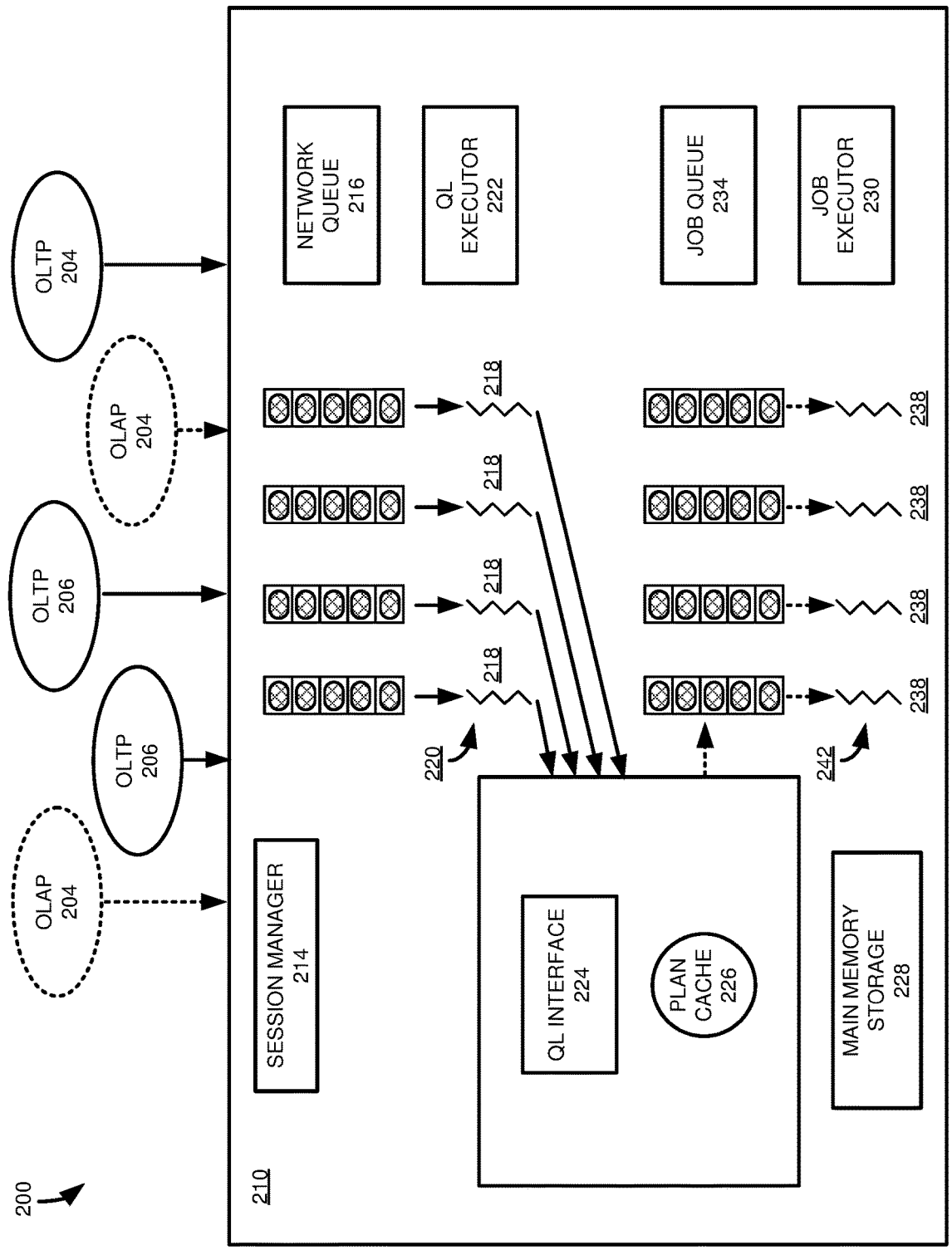
FIG. 2 is a diagram depicting a database environment providing for processing of requests for database operations by a query language executor and a job executor.

FIG. 2 is a diagram of a database environment 200 illustrating how query statements or operations may be delegated to a job execution thread. The database environment 200 includes a plurality of clients 204 sending OLAP requests for processing and a plurality of clients 206 sending OLTP requests for processing. A session manager 214 of a database server 210 listens for requests from the clients 204 and 206. When an appropriate request is received, such as a query, the session manager 214 places the request in a network queue 216 to be sent to one of a plurality of query language execution threads 218 of a thread pool 220 of a query language executor 222. If the request includes data manipulation operations, the data manipulation operations can be carried out directly by the query language interface 224, such as using the query language processor 116.

When a request is received by a query language execution thread 218, its processing is immediately started by the query language execution thread. For example, the query language execution thread 218 may access a query language interface 224, which can, for example, include the query language processor 116 of FIG. 1. If, such as when determined by the session manager 214, a query is associated with a previously generated execution plan, the session manager 214 can retrieve the execution plan. For example, the session manager 214 can retrieve a stored execution plan from the plan cache 226. If an execution plan was not previously stored, an execution plan can be generated by the query language interface 224. In executing the query language statement, the query language interface 224 can access main memory storage 228, such as memory including the row store 162, the column store 164, or both, of FIG. 1.

As discussed above, for certain queries, such as OLTP queries, the query and its operations or sub-operations can be carried out by the query processor 140 of FIG. 1 using the query language interface 224. When the query has been processed, the results are returned to the corresponding query language execution thread 218, and in turn returned to the client 204, 206 from which the query language request was sent. This process can be useful for short running queries, as it can avoid thread context switching, which can consume processing and memory resources in stopping, switching, and restarting threads.

For other types of transactions, such as OLAP queries, the query language executor 222 can delegate the query, or components thereof, to a job executor 230, which can operate in parallel to the query language executor 222. The operations of the query can be placed in a job queue 234 and then sent to one or more job execution threads 238 of a job execution thread pool 242. In at least some cases, the execution results of the job execution threads 238 are returned to the originating query language execution thread 218, and in turn to the client 204, 206 from which the request originated.

Figure 3:
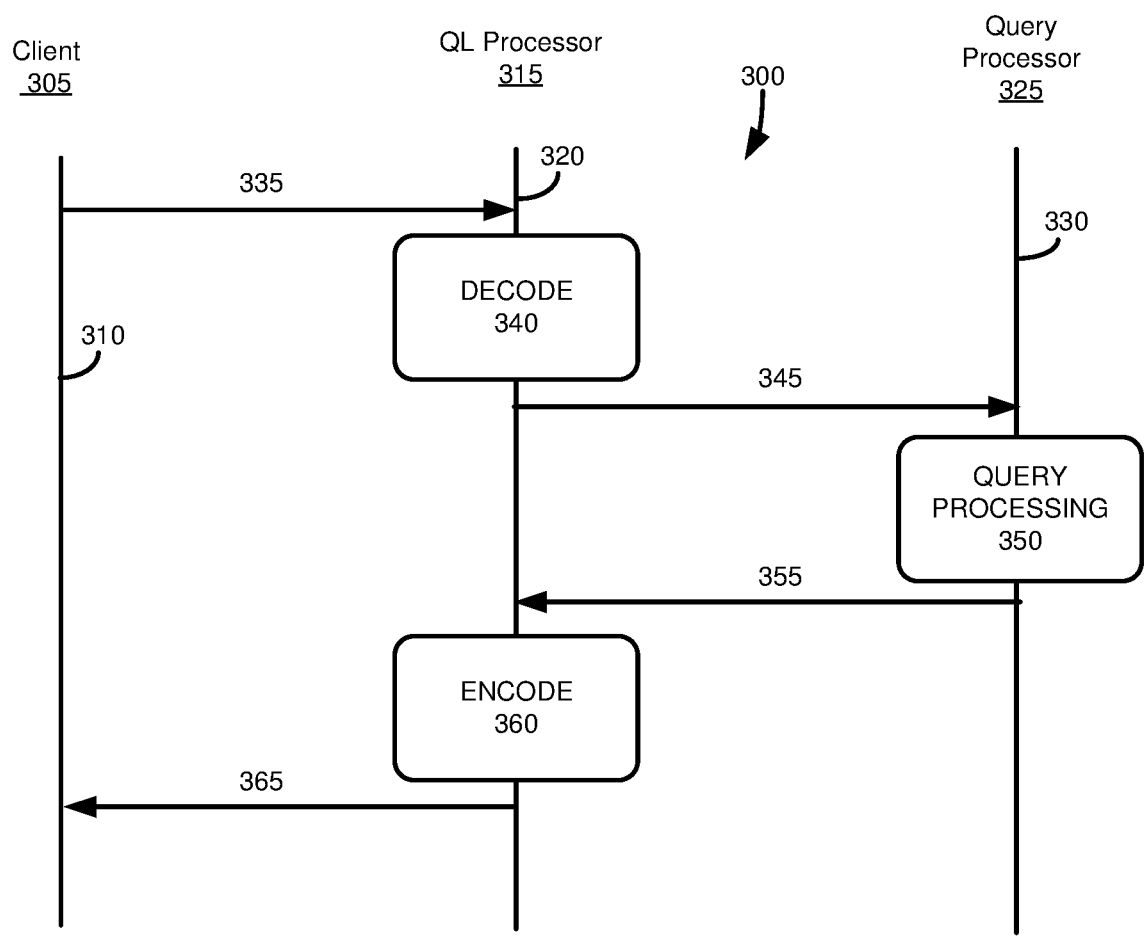
FIG. 3 is a diagram illustrating operations occurring at a query language processor and a query processor during execution of a query language request.

This process is further depicted in FIG. 3, a diagram of a database environment 300 illustrating operations occurring at a client 305, a query language processor 315, and a query processor 325, having respective execution timelines, 310, 320, 330. These components may be at least generally similar to the client 104, query language processor 116, and query processor 140 of FIG. 1.

In communication 335, the client 305 sends a request for a database operation. The request may first be processed by a session manger component (not shown) and then sent to the query language processor 315. When the request is received by the query language processor 315, the query language processor may decode the request in process 340. For example, the query language processor 315 may determine whether the request includes data manipulation statements, a query, or other types of operations, such as transaction control operations. If the request includes a query, the query language processor 315 may check to see if an execution plan has been previously generated for the query. If not, an execution plan can be generated.

Once the execution plan has been retrieved or generated, it is carried out by an execution thread of a query language executor of the query language processor 315 (such as the query language executor 120 of FIG. 1). The query language execution thread can send the query to the query processor 325 in communication 345, such as through a query language interface. The query language processor 325 carries out an execution plan for the query language request in process 350, such as involving appropriate query engines, such as the OLAP engine 142, the join engine 144, the attribute engine 146, or the calculation engine 148 of FIG. 1.

After execution of the query, the results are returned to the query language processor 315 (such as to the query language executor) by the query processor 325 in communication 355. The query language processor 315 encodes the results in process 360 and transmits the encoded results back to the client 305 in communication 365.

Figure 4:
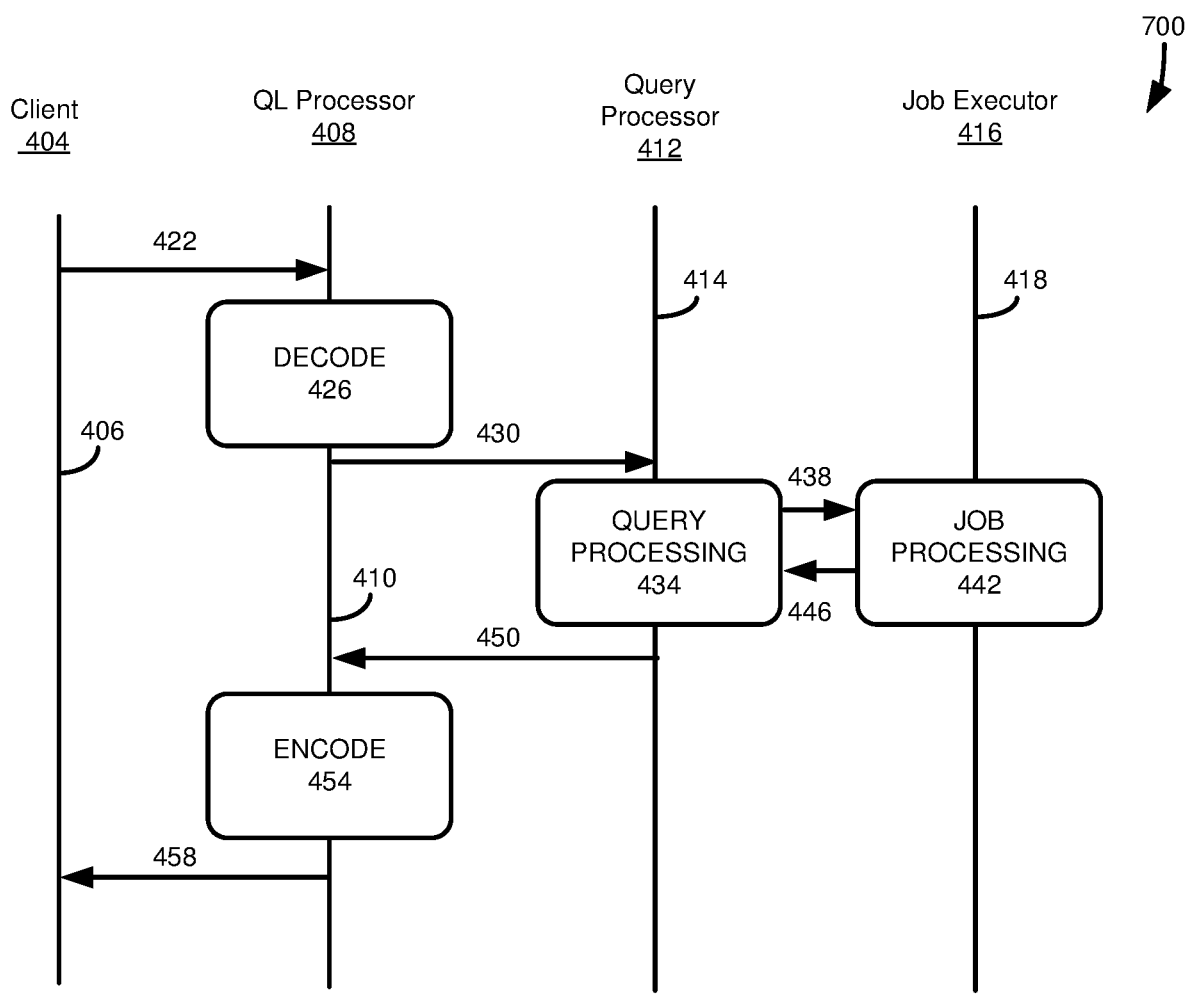
FIG. 4 is a diagram illustrating operations occurring at a query language processor, a query processor, and a job executor during execution of a query language request.

FIG. 4 is a diagram illustrating operations occurring at a client 404, a query language processor 408, a query processor 412, and a job executor 416, having respective execution timelines 406, 410, 414, and 418. In communication 422, the client 404 sends a request for a database operation. The request may first be received by a session manager component (not shown) and then sent to the query language processor 408.

When the request is received by the query language processor 408, in process 426, the query language processor 408 decodes the request. If the request includes data manipulation statements, they may be executed by the query language processor 408. Other types of requests, such as transaction control statements, may be sent to another component for processing. If the query language processor 408 determines that the request includes a query, the query language processor can determine whether an execution plan has already been created for the query. If not, an execution plan can be generated.

Once the execution plan has been generated or retrieved, the query is forwarded to the query processor 412 in communication 430, such as using a query language interface. In executing the query, the query processor 412 can determine that the query includes operations that can be carried out in parallel. In at least certain cases, these operations can be sent, in communication 438, to the job executor 416 to be processed.

The job executor 416 carries out the query operations in process 442, such as using one or more, such as a plurality, of job execution threads. In some cases, the job execution threads can invoke the query processor 412, such as to use one or more query engines. In other cases, the job execution threads can directly access the appropriate query engines.

When the operations of the query have been completed by the job executor 416, they can be returned to the query processor 412 in a communication 446. In turn, the query processor 412 can return the results to the query language processor 408 in communication 450. The query language processor 408 can encode the execution results in process 454, and return them to the client 404 in communication 458.

As shown in FIG. 4, the query language processor, such as a query language execution thread, is idle during the query processing 434 and the job processing 442. Thus, the query language execution thread is idle, and unable to service new query language requests, even though processor use by the database system may be comparatively low.

Figure 5:
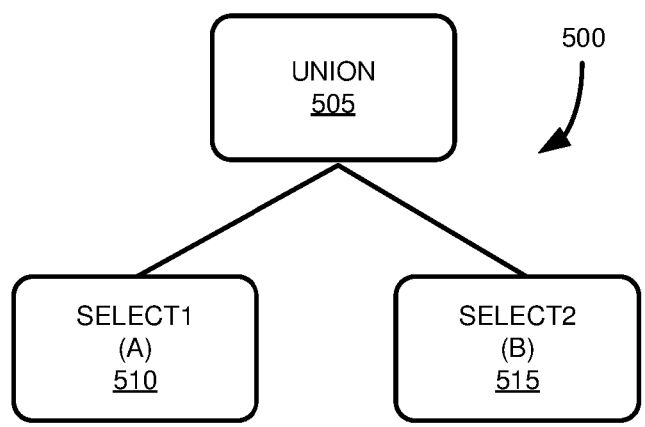
FIG. 5 is a diagram illustrating parallel execution of operations in a UNION operation.

FIG. 5 illustrates an example 500 of how this waiting situation might arise. Consider a UNION operation 505 that includes sub-operations of a first selection of records 510 from Table A and a second selection of records 515 from Table B. The UNION operation 505 cannot be completed until both SELECT sub-operations 510, 515 have completed. However, the delay in executing the UNION operation 505 results in, with reference to FIG. 2, the source query execution thread 218 being unable to accept new query language requests at the network queue 216.

Example 3

Context-Aware Workload Dispatching

Figure 6:
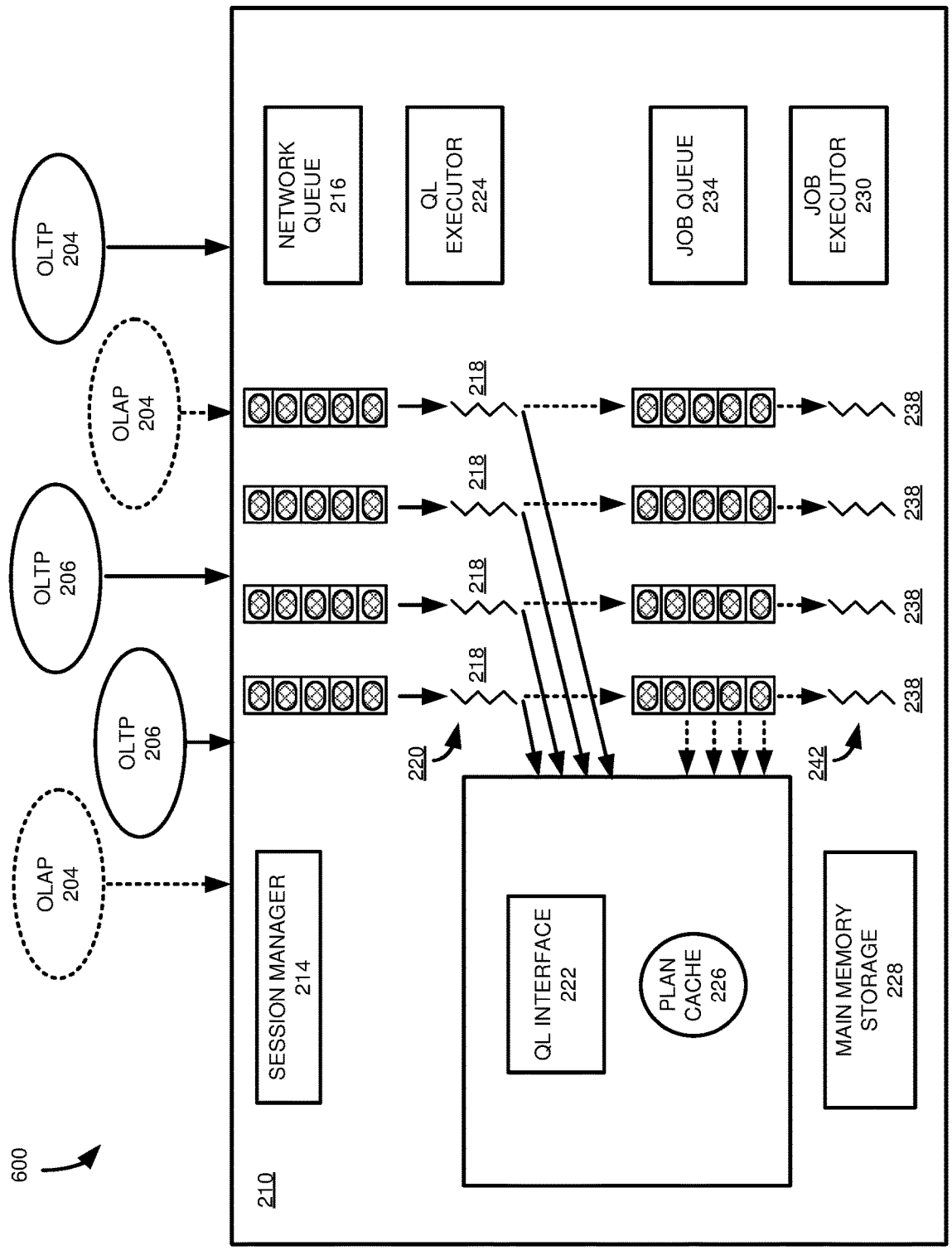
FIG. 6 is a diagram depicting a database environment providing for processing of requests for database operations by a query language executor and a job executor, with query language request delegation being determined by a session manager component.

With reference to FIG. 6, this Example 3 describes an example database environment 600 that can provide for improved query processing by determining, prior to execution, whether a query should be processed by a first execution component or a second execution component. FIG. 6 includes components that are at least generally similar to the components described with respect to FIG. 2. In addition, FIG. 6 can use the database environment depicted in FIG. 1.

In particular, the database environment 600 illustrates how, under certain circumstances, queries may be delegated to a job execution thread 238 of the job executor 230 prior to execution of the query. For example, if the query contains features, such as operations, that might delay execution or otherwise result in a long-running query, the query can be delegated to the job executor 230 prior the start of query execution.

As described above in conjunction with FIG. 2, the session manager 214 receives query language requests from clients 204 having OLAP database operation requests and clients 206 having OLTP database operation requests. It should be appreciated, however, that this Example 3, and the database environment 600, may be used with other types of requests for database operations (requests other than, or in addition to, OLAP or OLTP requests). In addition, in at least some cases, this Example 3 can be carried out by components other than those specifically described herein.

If a request contains a query (such as determined by a component of the query language interface 222, such as the query language processor 116 of FIG. 1), the session manager 214 assigns the query to a free query language execution thread 218 of the thread pool 220. A component of the database environment 600, such as the session manager 214, analyzes statistics associated with an execution plan associated with the query, such as an execution plan stored in the plan cache 226, or an execution plan generated by a component of the query language interface 222 (such as the query language optimizer 132 of FIG. 1). In other implementations, the analyzing can be carried out by, or in conjunction with, one or more additional components of the database environment 600.

If the execution plan indicates that the query does not contain operations likely to delay execution or otherwise result in a long-running query, such as having OLTP operations, or otherwise having no, or comparatively few, parallel operations, the session manger 214 (or other component) can determine that the query can be processed in a similar manner as described in conjunction with FIG. 2. That is, the query language execution thread 218 can pass the request to the query processor 140 of FIG. 1 using the query language interface 222, and as indicated using solid arrows.

If, on the other hand, the session manager 214 determines that the query includes operations that might delay execution or result in a long-running query, such as OLAP operations, or otherwise having, such as having a comparatively large number of, parallel operations, the session manager 214 can determine that the query should be delegated by the query language execution thread 218 to a job execution thread 238 of the job executor 230, as shown in dashed arrows. After the query has been delegated, the query language execution thread 218 can be returned to the thread pool 220, where it is available to service new or pending query language requests. After the query is executed by the job execution thread 238, the job execution thread can encode the results and send them to the appropriate client 204, 206.

As mentioned above, in some cases, the query may not have an execution plan stored in the plan cache 226. In some cases, such a query can be processed according to the process depicted in FIGS. 2-5. In a particular example, statistics from the execution of the query can be measured and used during future query processing. For example, the statistics can be stored in an execution plan stored in the cache 226 for the next time the query is received. In other cases, the database environment 600 may use another method to determine whether the query language execution thread 218 should delegate the query to a job execution thread 238. For example, statistics may be generated during optimization of the query by the query language optimizer 132 of FIG. 1. These statistics may be used in a similar manner as the statistics associated with a cached execution plan to determine whether the query should be executed by a query language execution thread 218 or a job execution thread 238. In another example, the query can be assigned a type (such as a type based on the query including a certain number, or type or types, of operations, or other measures of complexity) and execution statistics associated with the type (or a rule based on execution statistics associated with the type) used to determine whether the query should be executed by a query language execution thread 218 or a job execution thread 238.

Figure 7:
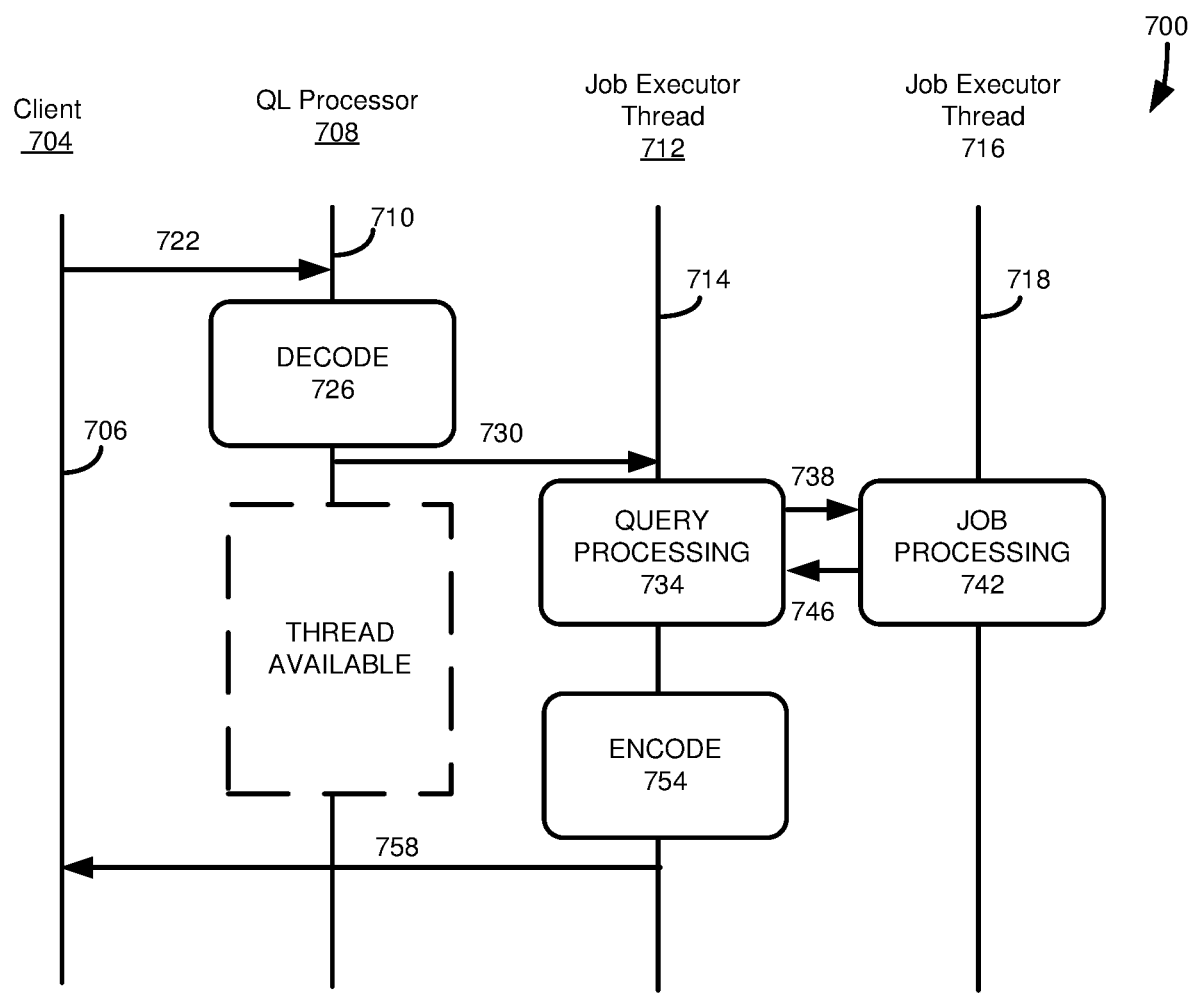
FIG. 7 is a diagram illustrating operations occurring at a query language processor, a first, delegee, job execution thread, and a second job execution thread during execution of a query language request.

The process of determining whether a query execution thread 218 should delegate a query is further depicted in FIG. 7, a diagram illustrating operations occurring at a client 704, a query language processor 708, a first, delegee, job execution thread 712, and a second job execution thread 716, having respective execution times, 706, 710, 714, 718. In communication 722, the client 704 sends a query language request. The communication 722 may be received by a session management component (not shown) and then sent to the query language processor 708. In process 726, the query language processor 708 decodes the query language request. If the query language request includes data manipulation statements, it may be directly executed by the query language processor 708. Other types of requests may be sent to another component of a database environment. For example, transaction control statements may be forwarded to a transaction manager component.

If the request includes a query, the session manager (or other component) analyzes statistics associated with the query. For example, the session manager can retrieve and analyze statistics associated with a cached execution plan, or statistics generated by a query language optimizer.

If, in association with process 726, the session manager determines that query does not contain operations likely to delay execution or otherwise result in a long-running query, the session manager can determine that the query should be executed by the query language processor 708 (such as using a query language execution thread of a query language executor) in a process analogous to that described with respect to FIG. 3, and which will not be further described with reference to FIG. 7. If the session manager determines that the query contains operations likely to delay its execution or otherwise result in a long-running query, or has statistics that would indicate potentially delayed execution, or statistics that indicate that parallelization would enhance execution of the query, the session manager can cause the query language execution thread 708 to delegate the query to the delegee job execution thread 712 in communication 730.

The delegee job execution thread 712 processes the query in process 734. As part of the query processing, the delegee job execution thread 712 can pass query operations to one or more additional job execution threads 716 in communication 738 (which can represent multiple communications). The one or more job execution threads 716 carry out job processing in process 742. At least some of the processing may be carried out in parallel, such as using multiple job execution threads. When job processing is completed, the one or more job execution threads 716 send execution results to the delegee job execution thread 712 in communication 746.

After receiving the results from the one or more additional job execution threads 716, the delegee job execution thread 712 encodes the results in process 754. The encoded results are returned to the client 704 in communication 758.

In the process shown in FIG. 7, once the query has been delegated by a query language execution thread of the query language processor 708 to the delegee job execution thread 712, the query language execution thread can return to an idle state, where it can accept other new or pending query language requests. Thus, by freeing up query language execution threads, the process described in this Example 3 can improve the throughput and processing times for query requests, particularly for OLTP requests. This improvement can be particularly beneficial in database systems having mixed OLTP and OLAP workloads.

Statistics measured, collected, and analyzed to determine whether a query language request should be delegated from a query language execution thread to a job execution thread can include statistics related to the nature or type of the request. Examples of query language requests include quests to compile a query, requests to execute a query, requests to close a cursor, requests to read or write large binary objects, batch execution requests, and authentication requests. Certain types of requests, such as non-query requests, can be selected, such as by a session manager component, for execution by a query language execution thread or another execution component.

Execution statistics can also include the time taken to execute a particular request, such as an average or other computed value for a particular type of query, or as indicated for the query in an execution plan associated with the query. The average execution time for statements or operations in the query can also be collected and analyzed. In some cases, the average execution time of a query, or statements or operations of the query, can be collected by a component of the database management system, such as the query processor 140 of FIG. 1, and stored in the plan cache 136.

The average number of threads involved with the query, such as the number of threads used to execute a single statement, can also be measured and analyzed. For example, a UNION operator can be parallelized, creating two jobs to be executed by job execution threads. So, for a UNION statement, the number of involved threads is two. In some cases, the number of threads required for all operations in the query can be determined and analyzed to determine whether the query should be delegated. If network calls are involved in the query language request, they can also be measured and analyzed, as they can affect execution time.

In some cases, one or more components can be added to the database management system to collect or analyze the statistics. In other cases, existing database management system components can be used, such as shown in FIG. 8.

Figure 8:
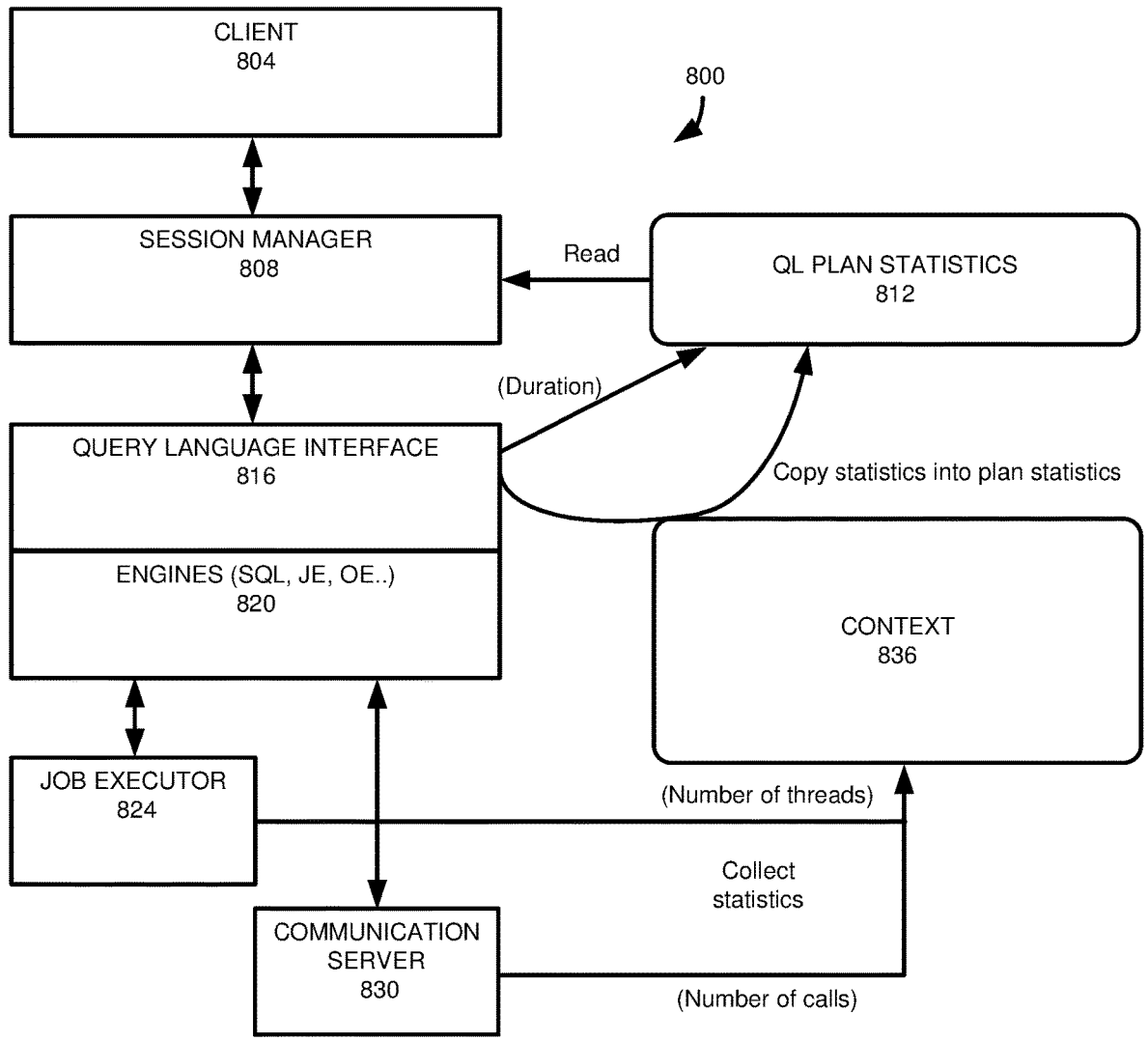
FIG. 8 is a diagram depicting a database environment providing for accessing or measuring execution statistics.

FIG. 8 illustrates a database environment 800 that can be used to carry out the process of this Example 3, including the collection and analysis of statistics associated with a query. The database environment 800 includes a client 804, which can issue query language requests and receive execution results. The requests, and sending of responses, can be mediated by a session manager 808. In addition, when the query language request includes a query, the session manager 808 can read and analyze query plan statistics 812 associated with the query. In a particular example, the query plan statistics 812 can be implemented as an abstract data type. As explained above, in some cases, the query plan statistics can be stored in a plan store, such as the plan cache 136 of FIG. 1. In other cases, the query plan statistics 812 can be obtained from another component of the database management system 800, such as the query language optimizer 132 of FIG. 1.

After analyzing the query plan statistics 812, the session manager 808 forwards the query to a query language interface 816, which can include the query language processor 116 of FIG. 1. The query language interface 816 can pass the query to various engines 820, which can in turn involve the query processor 140 of FIG. 1 and its associated engines, including the OLAP engine 142, the join engine 144, the attribute engine 146, or the calculation engine 148. The query language interface 816 can communicate with the query plan statistics 812, such as to create or update plan statistics associated with the execution time of the query, including, in some cases, the execution time associated with individual operations or sub-operations included in the query.

Depending on the analysis of the query plan statistics 812, the query language request can be delegated by a query language execution thread to a job execution thread of a job executor 824. The job executor 824 may also invoke one or more engines of the engines 820 in order to carry out the operations of the query.

In some cases, in order to execute the query, the engines 820 may need to access resources over a network. For example, the database environment 800 may include multiple database servers. A particular query may require the engines to access data at more than one database server. The database environment 800 can include a communication server component 830 to mediate communications to provide such access.

Components of the database environment 800 can measure statistics of the query plan statistics 812. In some cases, the components can directly access and update the query plan statistics 812. The query language interface 816 can, in some examples, directly update the query plan statistics 812 regarding the duration of the query or operations or sub-operations within the query.

In other cases, components of the database environment 800 can measure statistics and update a context 836 associated with the query, such as a context 836 implemented as an abstract data type. The context 836 can be used to store other information related to the query request, such as a timestamp associated with the time the query language request was initiated, a session identifier, a transaction identifier, a statement identifier, dependencies on other jobs, and the number of threads used to execute the query. The context 836 can be made available to components of the database environment 800 at multiple execution layers.

In some implementations, the communication server 830 can measure the number of network calls and update the context 836. Similarly, the job executor 824 can measure the number of threads involved in the query (or operations or sub-operations of the query) and update the context 836, which can then be used to update the query plan statistics 812. In a specific embodiment, the query language interface 816 reads information from the context 836 and copies appropriate information into the query plan statistics 812.

Analyzing statistics to determine whether a query should be delegated from a query execution thread to a job execution thread can include comparing one or more of the query plan statistics 812 to a threshold value. In some cases the values can be compared, and the delegation decision made, based on the relationship of a single value to its threshold. For example, the delegation decision may be made if a single value of the number of threads or the number of network calls exceeds its threshold value. In other cases, the delegation decision can be based on the relationship of a combination of values of the query plan statistics 812 to their respective threshold values. For example, the query may be delegated if the number of threads exceeds a first threshold value and the number of network calls exceeds a second threshold value. In some cases, the delegation decision may be made based on a weighted combination of the statistics compared with their respective threshold values.

Figure 9:
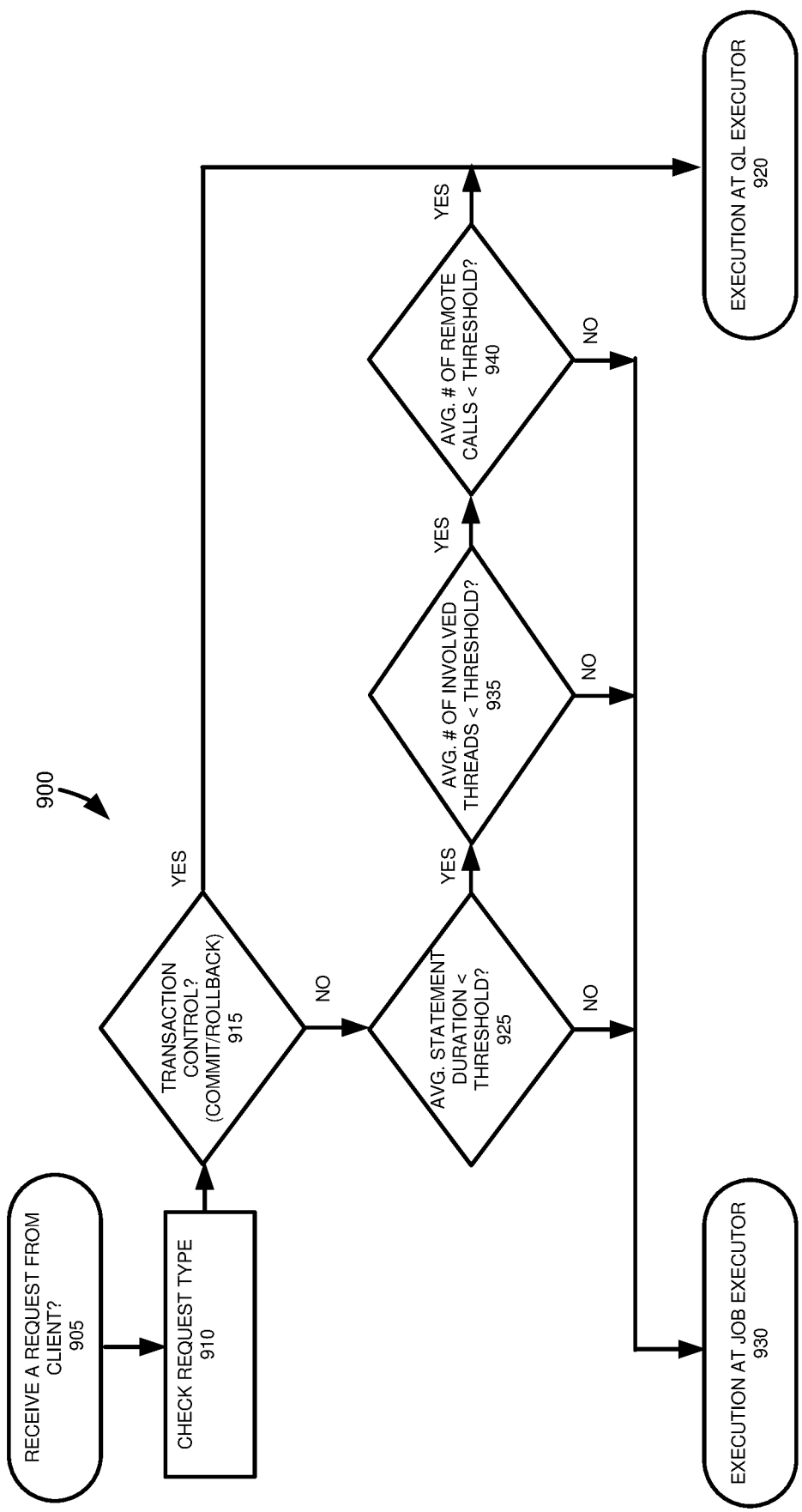
FIG. 9 is a flowchart of an example method for determining whether a query language request should be delegated to a second execution component.

FIG. 9 illustrates an example method 900 for determining whether a query language request received from a client should be delegated from a query language execution thread to a job execution thread. In a specific example, the method 900 is carried out by the session manager 112 of FIG. 1. In other examples, the method 900 is carried out by a different component, or a combination of components.

In step 905, the method 900 waits for a query language request to be received, such as from a client. In process 910, the method 900 checks the type of request. In decision 915, the process determines whether the query language request is a request to carry out a transaction control statement. For example, the decision 915 may determine whether the query language request is a request to commit or roll back a transaction. If the query language request is a transaction control request, the query language request is executed with a query language execution thread in process 920.

If decision 915 determines that the query language request is not a transaction control request, the method 900 proceeds to decision 925. Decision 925 determines, such as based on query plan statistics associated with a query of the query language request or a cached query plan associated with the query, whether the average statement duration exceeds a threshold. In other aspects, in place of, or in addition to, average statement duration, decision 925 can determine whether the average execution time for the query, or for all or a portion of operations or sub-operations within the query, exceeds a threshold. If decision 925 determines that the threshold has been exceeded, the query is delegated to a job execution thread and executed in process 930.

If decision 925 determines that the threshold has not been exceeded, in decision 935, the process 900 determines whether the average number of threads involved in a query of the query language request exceeds a threshold. If the threshold has been exceeded, the query is delegated to the job execution thread and executed in the process 930. If the threshold has not been exceeded, the method 900 proceeds to decision 940, determining whether the average number of remote calls (such as network calls) for a query of the query language request exceeds a threshold. If the threshold is exceeded, the query is delegated to a job execution thread and executed in the process 930. If the threshold has not been exceeded, the query is executed with the query language execution thread in process 920.

Although FIG. 9 has been described with a particular set of threshold comparisons occurring in a particular order, it should be appreciated that the comparisons 925, 935, 940 can be carried out in a different order. As described above, the comparisons 925, 935, 940 may also be combined or weighted. In addition, the method 900 can include more, fewer, or a different number or type of comparisons, including comparisons not described in FIG. 9, and decision 915 may be omitted, or other decision steps included in the method.

Figure 10:
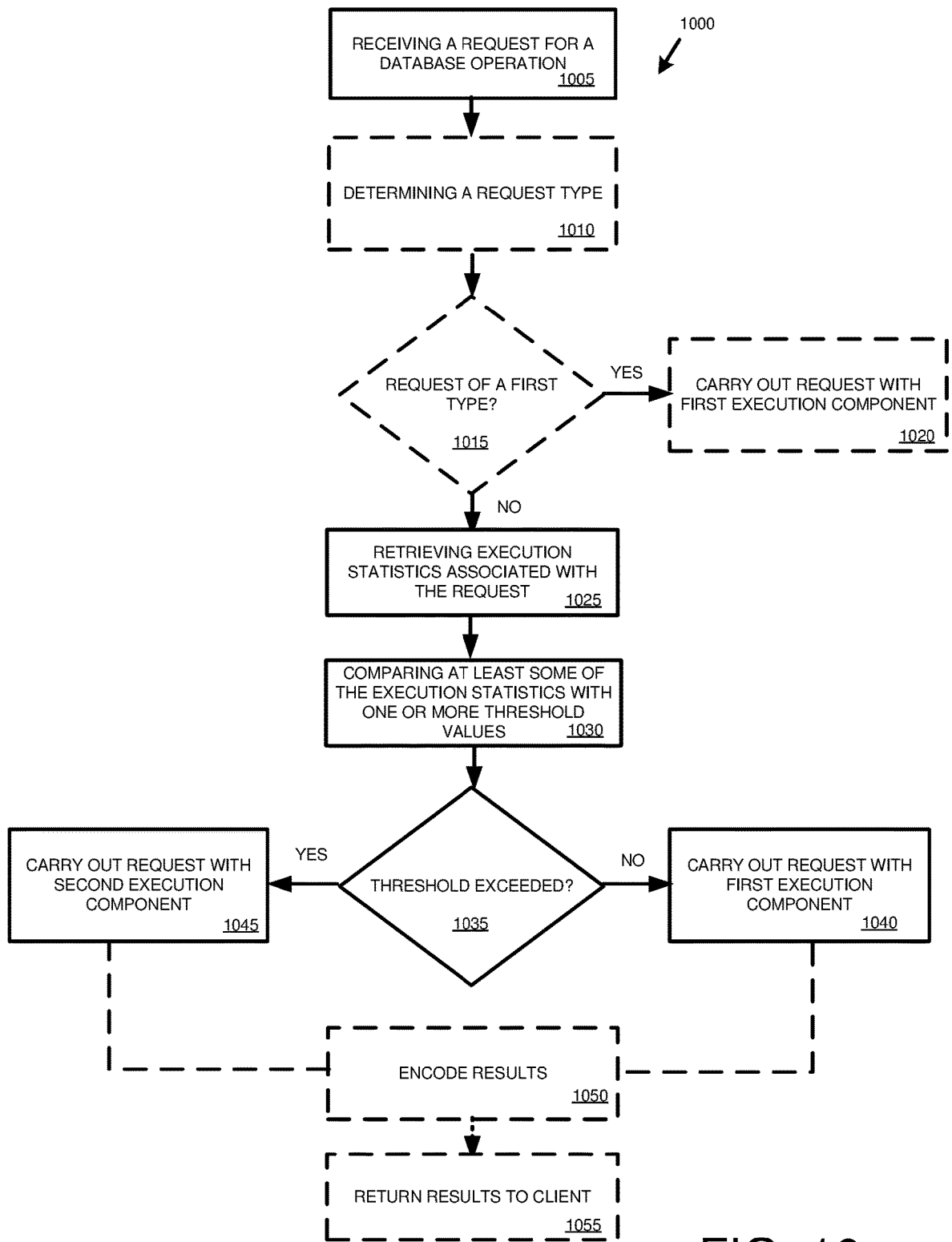
FIG. 10 is a flowchart of an example method for determining whether a query language request should be delegated to a second execution component.

FIG. 10 presents a flowchart of a method 1000 according to this Example 3. In step 1005, a component of a database management system receives a request for a database operation. In a particular example, the request is a query language request, such as a request that includes one or more DML statements or a query. The query can include one or more statements, which can in turn be associated with one or more operations or sub-operations. In a particular example, the request is received by a component of the database system responsible for mediating communications with clients. For example, a session manager component can listen for incoming client requests and assign each request to a database processing component.

In optional step 1010, a component of the database system, such as the session manager component, can determine a type for the request. The type can be, for example, a request to compile a query, to execute a query, to fetch a result, to close a cursor, to carry out batch executions, to read or write a large binary object, to carry out authentication operations, or to carry out transaction control operations, such as a request to commit a transaction or a request to roll back a transaction.

In optional decision 1015, the method 1000 determines whether the request is of a first type. If the request is of the first type, the method 1000 can carry out the request using a first execution component in process 1020. In a particular implementation, the first type is a transaction control operation. If the request is not of the first type, or if the decision 1015 is omitted, the method 1000 can proceed to step 1025.

In step 1025, the method 1000 retrieves execution statistics associated with the request, such as execution statistics associated with a query plan. For example, the request may be a query associated with a stored query execution plan, such as a stored query execution plan, that includes at least a portion of the execution statistics. In another aspect, the execution statistics are stored in another manner. In a further aspect, the execution statistics can be obtained by generating an execution plan for the request, such as during optimization of query processing, or by retrieving execution statistics for a request type represented by the request.

One or more of the execution statistics are compared with one or more threshold values in step 1030. In some cases, execution statistics to be compared, or the threshold values, can be set by a user providing user input, such as a database administrator. Based on results of the comparing, the method 1000 determines whether the request should be executed by a first execution component or delegated to a second execution component.

In a particular example, the method 1000 checks in decision 1035 to see if one or more of the threshold values has been exceeded. If the one or more threshold values have not been exceeded, the request, such as a query, is carried out by a first execution component in process 1040, such as by a query language execution thread in communication with a query language processor. If the one or more threshold values have been exceeded, the request can be delegated to a second execution component, such as a job execution thread of a job executor component, and executed in process 1045. When the second component is a job execution thread, the job execution thread can carry out statements or operations of the request using one or more additional job execution threads.

In optional step 1050, after the request, such as a query, has been carried out, execution results can be encoded to a format useable by the client. For example, the execution results can be encoded by the component which carried out the request. In optional step 1055, the execution results can be returned to the client, such as by the component which carried out the request.

The method 1000 can include additional steps. For example, the method 1000 can include measuring execution statistics during execution of the request. In a particular example, a request, such as a query, may be received for which execution statistics have not previously been measured or stored. In one implementation, in this scenario, the request may be executed in a manner other than as shown in FIG. 10. According to a particular aspect, the request can be executed by the first execution component, which can in turn use the second execution component. For example, with reference to the database environment 100 of FIG. 1, if execution statistics have not previously been stored, such as in the plan cache 136, the request can be executed as described in FIGS. 2 and 3. Execution statistics can be measured when the request is executed, and then stored. If the request is received again, the method 1000 can be carried out using the previously measured execution statistics.

In another aspect, execution statistics can be measured during the execution of method 1000. The measured execution statistics can be used to update the execution statistics associated with the request, such as execution statistics stored in the plan cache 136 of FIG. 1. For example, during execution of the method 1000, components of the database system 100 of FIG. 1 can measure statistics and associate them with an execution context for the request. Components which can measure statistics include the query language executor 120 and the job executor 154 of FIG. 1, and the communication server 830 of FIG. 8.

In a further aspect, if execution statistics have not been previously measured during the execution of the request, execution statistics, such as prospective execution statistics (including execution statistics for a type of request represented by the request), can be obtained from another component of the database system. For example, the query language optimizer 132 may determine a number of operations, a number of network calls, a number of needed threads, or a number of parallel operations carried out in executing the request.

In some cases, the method 1000 can be selectively enabled. For example, one or more criteria may be set for when the method 1000 should be enabled or disabled. One criteria may be processor utilization of a computing system responsible for implementing the method 1000. As delegation to the second execution component (such as a job execution thread) can increase processor usage, the method 1000 can be set to be disabled when processor use exceeds a threshold, or enabled when processor use is below a threshold.

The number of available query language execution threads can also be used to determine whether the method 1000 should be enabled. If the number of available execution threads is too low, the database system may be unable to timely process new client requests. Accordingly, the method 1000 can be enabled if the number of available query language execution threads is less than a threshold amount. Similarly, the time needed to execute requests, particularly OLTP requests can be monitored. If OLTP requests are determined to be taking longer than a threshold amount, the method 1000 can be enabled. Delegation of requests, particularly OLAP requests, to job execution threads can free up query language execution threads to process incoming OLTP requests.

As described above, in at least some cases, query language execution threads may be unable to handle additional client requests until a prior request has been completed. In such cases, additional query language execution threads can be spawned to handle additional requests. However, this process can result in a large number of active threads, which can negatively affect system performance (such as processor use). Therefore, in some implementations, the method 1000 can be enabled if the number of active query language execution threads exceeds a threshold.

Example 4

Dynamic Admission Control for Database Requests

The technologies described in Examples 2 and 3 can improve the processing of database requests by delegating certain requests to threads in a job execution framework, which can free threads in a query language processor to handle additional database requests. These approaches can be particularly useful when there are free job executor threads available to accept database requests. However, if a database system receives a large number of requests, the system may run out of available job executor threads, or system resource use may be undesirably high, regardless of whether job executor threads are available for incoming threads. As discussed in Example 1, if the database system is overloaded, its performance may be reduced, and the system may hang or enter a deadlocked state.

This Example 4 describes innovations that can be used to provide dynamic admission control for database requests. The innovations can be used with other technologies for the scheduling and routing of database requests, including the technologies described in Examples 2 and 3.

Figure 11:
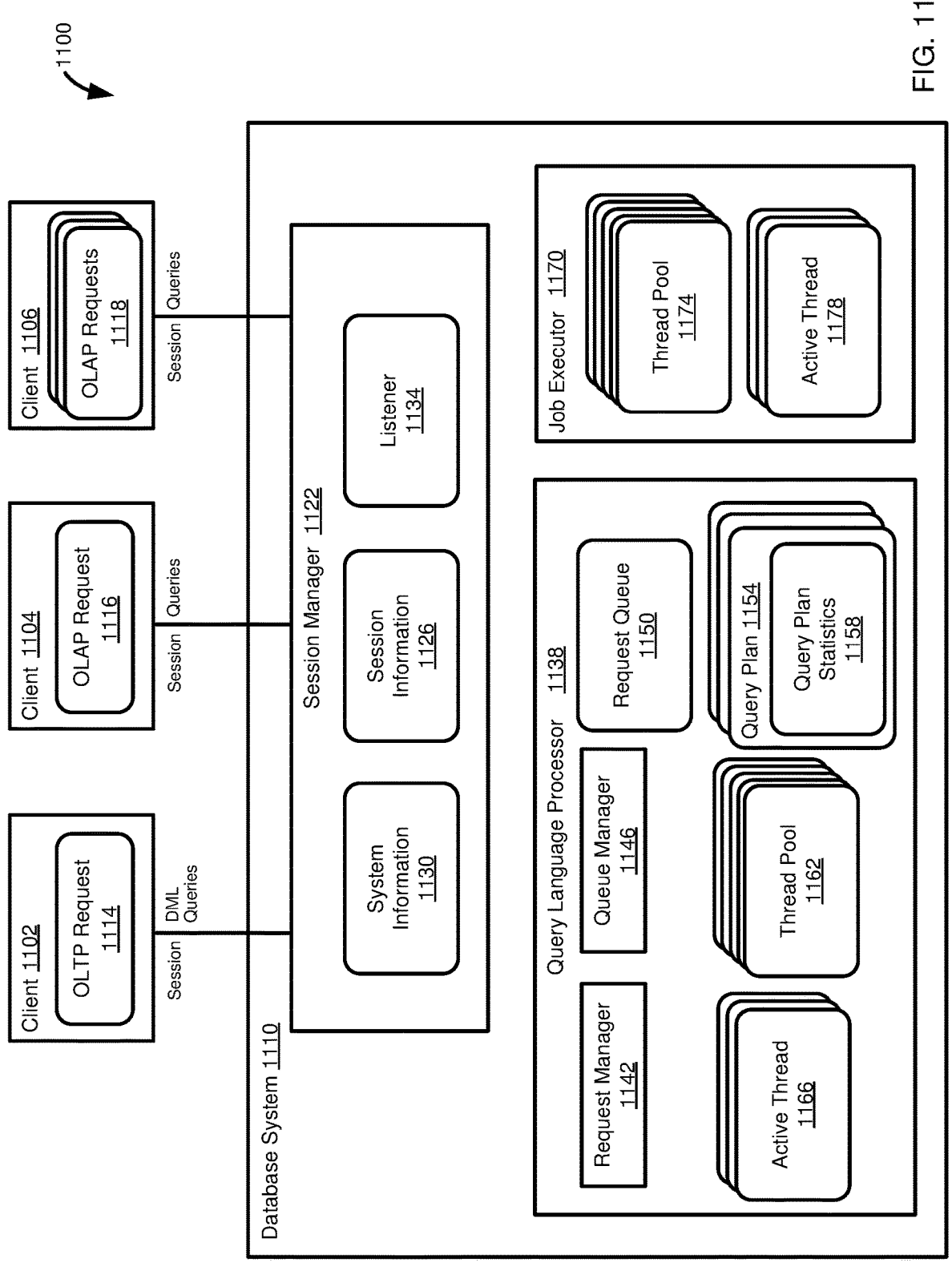
FIG. 11 is a diagram depicting a database environment that can be used to implement disclosed innovations relating to dynamic admission control for requests for database operations.

FIG. 11 illustrates an architecture for a database environment 1100 in which at least certain disclosed innovations can be implemented. The database environment 1100 includes database clients 1102, 1104, 1106 and a database system 1110. Although three database clients 1102, 1104, 1106 are shown, in practice, the database environment 1100 can include more or fewer database clients than shown. Additionally, although the database system 1110 is shown as a single component, in some embodiments, the database system 1110 can be implemented in multiple physical computer devices.

Each client 1102, 1104, 1106 can issue one or more types of database requests. For illustrative purposes, client 1102 is shown as sending OLTP requests 1114 to the database system 1110. OLTP requests 1114 can be, for example, requests to create or modify data in the database system 1110 (e.g., DML statements that update, insert, or delete records), transaction control commands (e.g., to commit or roll back a transaction), and commands that modify the format of data records (e.g., data definition language, or DDL, statements that create, modify, or remove tables and other database objects), and typically, relatively simple queries. Clients 1104 and 1106 are shown as sending OLAP requests 1116, 1118 to the database system. OLAP requests 1116, 1118 can include, for example, more complex queries, such as queries that aggregate data or access a large number of database record, and batch operations to modify, add, or delete data.

In some cases, the database clients 1104, 1106, and their corresponding OLAP requests 1116, 1118 can have different properties. For example, requests 1116 may be more or less complex, or time consuming, than requests 1118. Or, clients 1104, 1106 can be associated with different priorities or privileges.

The database clients 1102, 1104, 1106 can connect to the database system 1110, such as over a network, through a session manager component 1122 of the database system, which can be part of a session layer that also includes a query language processor 1138. The session manager component 1112 can be responsible for establishing and monitoring connections with the database clients 1102, 1104, 1106, as well as initially receiving requests for database operations and other requests from the database clients, as well as returning information to the database clients.

The session manager 1122 can track various parameters of a session with a database client 1102, 1104, 1106 and store the information as session information 1126. For example, the session information 1126 can include an identifier for the database client 1102, 1104 1106, which may be associated with a priority level (that is, requests from that database client may be prioritized lower or other than for other database clients), and information regarding prior database requests issued by the database client, including in a particular session (e.g., a particular connection instance between the client and the database system where one or more database operations are carried out).

For each request, the session information 1126 can include the type of database request (e.g., a query, a DML statement), as well as information related to the execution of the request, such as the time taken to execute the request, the number of operations in the request, the degree of parallelizability of the request, the amount of processor power and memory used in executing the request, disk and network access involved with the request, and the like. In at least some cases, session information 1126 can include information associated with, or derived from a query plan, such as the query plan statistics 812 of FIG. 8.

The session manager 1122 can also store, or access, system information 1130. System information 1130 can include information regarding the overall performance and utilization of the database system 1110, including information such as the number of active connections (e.g., to database clients 1102, 1104, 1106), the total number of used and available threads for different processes, the amount of memory used and available, the overall processor use of the system (and optionally the loads on individual processors), disk input/output activity (including the number of processes accessing a disk or other hardware resource), available and used network bandwidth, and the like.

The system information 1130 can be used by a component of the database system 1110 to determine whether new requests should be accepted from database clients 1102, 1104, 1106, as well as whether previously accepted, but not yet executed, requests can be executed. In some cases, the system information 1130 can be associated with a particular time point (e.g. the specific time when the parameters were measured or collected). In other cases, the system information 1130 may reflect the parameter values over a time period, including using an averaging technique or function. In a particular example, the system parameters can be calculated using an exponentially weighted moving average.

Determining whether new requests can be accepted can include comparing resource use values (including averaged values) to one or more thresholds, and accepting, queuing, or rejecting a request if any one of the resource use values exceeds its threshold. In other cases, accepting, queuing, or rejecting new requests can occur if a combination, including a weighted combination, of use values exceed their corresponding thresholds. Or, multiple use values can be combined, including as a weighted combination, and the combined value can be compared with one or more threshold values.

The disclosed innovations provide for accepting and processing new database requests from database clients 1102, 1104, 1106 if the system information 1130 indicates that system resource use is below a threshold. New database requests from database clients 1102, 1104, 1106 are accepted, and placed in a queue, if system resource use is higher than the threshold. Optionally, in some embodiments, requests for database operation can be refused or rejected if system resource use is higher than another threshold, or if the queue is full.

The session manager 1122 can include a listener component 1134. The listener component 1134 can collect system use information to be included in the system information 1130, including performing calculations or comparisons on the system information (e.g., calculating an average, such as a rolling average, of use values of one or more system resources, aggregating, including using a weighting scheme, a plurality of system resource use values, or comparing system resource use values with threshold values).

The listener component 1134 can perform additional functions. For instance, the listener component 1134 can periodically, such as at a dequeuer interval, determine whether the system information 1130 indicates that additional requests can be executed. If additional requests can be executed, the listener component 1134 can dequeue one or more requests from the queue. In some cases, the number, or type, of requests to be dequeued can be determined by the listener component 1134 based on available resources. For example, if more resources are available, more requests can potentially be dequeued. Or, if the request at the head of the queue will require a large amount of resources, the single request can be dequeued, or one or more less resource intensive request can be dequeued instead of the larger request.

There may be a practical limit to the amount of time for which a request can be queued, or processing otherwise delayed. That is, after a period of time, the results may no longer be of use/valid (e.g., for OLTP transactions where data may change frequently and current/correct data need be processed), or the amount of delay may be otherwise unacceptable from the perspective of the database client, be it an end user or application. The listener component 1134 can periodically, such as during the dequeue interval, determine if any queued requests have expired. A request (such as a SQL request) may specify a maximum amount of delay, or timeout value, for the request. Or, the listener component 1134 can apply a default maximum delay value, which can be applied, for instance, when a request does not otherwise specify a timeout value. If the specified, or default, timeout value has been exceeded, the listener component 1134 can return (or cause to be returned) an error message to the database client 1102, 1104, 1106 and remove the request from the queue. Typically, a maximum of delay, particularly for a default system value, is set to be larger than the dequeue interval. Otherwise, the queued request may timeout before the next dequeue interval. When a default timeout value is provided, the value can be fixed (and larger than the dequeue interval), or can be dynamic, including being dynamically adjusted to be larger than a dynamically-adjusted dequeue interval (e.g., can be longer or shorter based on various performance considerations).

The listener component 1134 can take other actions regarding the queue, such as reordering the queue. For instance, the listener component 1134 may reorder (including causing the reordering) the queue such that queued requests that are approaching a timeout value are placed at the head, or at least more towards the head, of the queue.

The database system 1110 can include a query language processor 1138. In some cases, the query language processor 1138 can be, or can be analogous to, the query language processor 116 of FIG. 1. The query language processor 1138 and the session manager 1122 can both be part of a session layer of the database system that interacts with (e.g. receives requests from and returns responses to) the database clients 1102, 1104, 1106. The query language processor 1138 can include a request manager component 1142. The request manager component 1142, in at least some cases, initially receives requests from the database clients 1102, 1104, 1106. The request manager 1142 can access the system information 1130, and at least in some cases, the session information 1126, of the session manager 1122 in order to determine how a request should be processed. For example, the request manager 1142 can make a determination whether sufficient resources are available to process the request (in which case the request can be admitted for processing) or if available system resources are below a threshold level and the request should be added to a request queue. In some implementations, the request manager 1142 can also determine that system resource use is sufficiently high, or the queue full, such that a request should be rejected and a corresponding message sent to a database client 1102, 1104, 1106.

If the database system 1110 has sufficient resources to immediately process the request, that request can be processed, in some aspects, in a conventional manner (including as described in Example 2). In other cases, additional dispatching techniques can be applied to the request. For instance, an admitted request can be processed as described in Example 3, with the request being processed by a thread of the query language processor in some cases, and in other cases (such as when the request is long-running, includes remote calls, or involves a large number of execution threads) can be delegated to a job executor thread, which can free the query language processor thread to handle other requests.

If the request manager 1142 determines that the available system resources are too low to immediately process a request (and, optionally, are higher than a threshold value that would result in outright rejection of the request), the request can be enqueued in a request queue 1150 by a queue manager component 1146. The request queue 1150 can be the queue accessed by the listener component 1134. Or, the listener component 1134 can direct the queue manager component 1146 to take various actions, including dequeuing requests (including for execution or as part of a timeout process), analyzing queued items, or reordering queued items.

The request queue 1150 can be a data structure physically implemented in a computer device (e.g., in memory and/or stored in a persistent storage medium). In some cases, the request queue 1150 can be implemented as a priority queue, or can otherwise apply additional criteria for ordering or dequeuing elements. For instance, some requests may be associated with a higher-priority user or process, and so may be placed in front of lower-priority requests, even if added later to the queue.

As described above, in some cases, queues can be ordered, or requests dequeued, based on their timeout values. That is, a request that is close to timing out may be enqueued more towards the head of the queue than a position based simply on when the request was added to the queue, or can otherwise be dequeued earlier than would be indicated by its position in the queue. In other cases, requests can be allowed to timeout without changing their position in the queue. When the request comes to the head of the request queue 1150, if the request has been determined to have timed out, it can simply be dequeued without processing the request (other than, for instance, sending an error or timeout message to the database client 1102, 1104, 1106 which sent the request). In other implementations, the queue manager 1146 (or another component of the database system 1110, such as the listener 1134) can periodically traverse the queue in a garbage-collection or housekeeping function and remove expired requests from the queue. Removing expired requests from the request queue 1150 can be beneficial, for example, when the queue has a fixed size and new requests cannot be added to the queue because the queue contains one or more expired requests.

The request queue 1150 can be implemented in any appropriate manner (e.g., an array, a linked list, or a heap). In addition, although described as a queue, the request queue 1150 can, if desired, be replaced with another type of data structure, including a stack, list, heap, tree, or the like. In particular, although described as having first-in-first-out properties for adding and removing elements (apart from priority and timeout handling, as described above), the request queue 1150 can be replaced by a data structure having other algorithms for adding and/or removing elements (e.g., a stack or other data structure having first-in-last-out properties).

The request queue 1150 can store information about queued requests, as well as the queued requests. Information that can be associated with queued items can include an identifier for the request, an identifier for the session associated with the request, a type associated with the request (e.g., prepare statement, close statement, execute statement, close cursor), a statement type (e.g., DML or DDL), a time the request was enqueued, and a timeout value.

In some cases, the decision by the queue manager 1146 to enqueue a request, or by the listener 1134 to dequeue a request (including directing the queue manager to dequeue a request, including for processing by the a job executor component 1170 or providing an error message to a database client 1102, 1104, 1106), can include accessing information related to the request, or the requestor (e.g., a particular database client). In particular, the queue manager 1146 and/or listener 1134 can access the session information 1126 and information related to a query plan 1154. For example, as indicated in the session information 1126, a particular session may be associated with a higher or lower priority than other sessions, or session information may be used to gauge the potential resource use associated with a request from a particular client 1102, 1104, 1106 (in turn associated with a particular session). Higher priority sessions may be prioritized by the listener 1134 for dequeuing. Information regarding potential resource use by a request may be gauged using the session information 1126, with increased resource use typically making it more likely that a request will be enqueued in the request queue 1150 by the queue manager 1146, and used by the listener component 1134 to determine whether free system resources are sufficient to allow a particular request to be dequeued.

In some cases, a request can be one that was previously executed on the database system 1110, or for which prospective execution information is available (e.g., through a query plan, including based on the results of a query optimizer, such as the query optimizer 132 of FIG. 1). For example, the request may be associated with a query plan 1154. In addition to containing information concerning how the request can be executed, a query plan 1154 can be associated with query plan statistics 1158. Query plan statistics 1158 can include, for example, information regarding the total execution time associated with a request, the average execution time for a request, how many times the request was executed, the number of records returned by the request, the amount of time the request spent waiting for a lock (e.g., a record or table lock) to become available, and total, maximum, average, and minimum values for execution memory size, execution reused memory size, and CPU time.

The query plan statistics 1158 thus can provide a guide as to the resource use of a request. When a request is received, the query manager 1146 can determine if the request is associated with a query plan 1154. If the request is associated with a query plan 1154, the corresponding query plan statistics can be compared with the currently available system resources. If the comparing indicates that the database system 1110 has sufficient resources to process the request, the request can be admitted for further processing by the query language processor 1138. If the comparing indicates that the database system 1110 does not have sufficient resources to process the request, the request can be enqueued in the request queue 1150 by the queue manager 1146.

Similarly, when the listener 1134 determines, after an interval has passed, whether one or more requests can be dequeued, the listener 1134 can access the query plan statistics 1158 of the request (if available), as well as the system information 1130 and the session information 1126, in order to determine whether the available resources are sufficient to process the one or more requests. In some cases, if the database system 1110 does not have sufficient resources to process the request at the head of the queue, no requests are dequeued for that dequeue interval. The determination of whether sufficient resources are available to process the request at the head of the queue can be made at subsequent time intervals until resources are sufficient to execute the request (in which case it is dequeued by the listener 1134) or the request has been for pending for longer than a timeout value (e.g., a system-supplied default value or a value provided with the request), in which case it can be dequeued and an error message returned to the appropriate database client 1102, 1104, 1106. In other cases, if the database system 1110 does not have sufficient resources to process the request at the head of the queue, other elements of the queue can be examined to determine whether the available system resources are sufficient for their execution, in which case the listener 1134 can dequeue the request for execution.

The query language processor 1138 can include a thread pool 1162 of available threads and one or more active threads 1166 (e.g., threads associated with the execution of a particular request). The database system 1110 can also include a job executor component 1170, which, in at least some cases, can be, or can be analogous to, the job executor 154 of FIG. 1. The job executor 1170 can have a thread pool 1174 and one or more active threads 1178 (e.g., threads associated with the execution of a particular request, or a component of a particular request).

When a request from a database client 1102, 1104, 1106 is originally received at the database system 1110, the request can be assigned to a thread of the thread pool 1162 of the query language processor 1138, thereby becoming an active thread 1166. Before executing the request, the request manager 1142 can determine whether sufficient system resources are available to execute the request. If sufficient resources are available, the request can continue execution with its assigned thread 1166, unless it is assigned, for example, to a thread of the job executor thread pool 1174, such as according to the embodiment of Example 3.

If sufficient system resources are not available to the execute the request, but the conditions for being added to the request queue 1150 are met, the request can be enqueued in the request queue, freeing the thread 1166, which can go into the thread pool 1162. If sufficient system resources do not exist, and the conditions for queuing are not met (e.g., the queue is full or the available system resources do not meet a threshold level), the request can be refused or rejected, a message sent to the database client 1102, 1104, 1106 which sent the request, and the thread 1166 returned to the thread pool 1162.

When the listener 1134 determines that sufficient system resources are available to dequeue one or more requests from the request queue 1150, the listener 1134 can send (or cause to be sent) the dequeued request to the job executor 1170. The job executor 1170 can assign the request to an available thread of the thread pool 1174.

FIG. 11 illustrates single instances of various components of the database system 1110, including the listener 1134, the queue manager 1146, and the request queue 1150. In some cases, to improve performance, multiple instances of the listener 1134, queue manager 1146, and/or request queue 1150 can be provided, as a single queue may be a performance bottleneck. For instance, in some cases, multiple instances of the listener 1134 can be provided, each being assigned to a plurality of different sessions. Each listener 1134 can be associated with a different request queue 1150 (although in some cases multiple listeners can share a request queue).

In some cases, multiple listeners 1134 can be provided, but a single instance of the request manager 1142 and queue manager 1146 are used. The request manager 1142 and queue manager 1146 can queue requests in the appropriate request queue 1150 for a particular session. In other cases, multiple instances of the request manager 1142 and/or queue manager are used 1146, such as having a separate instance of each assigned to each request queue 1150.

When a database system 1110 includes multiple request queues 1150, the dequeuing process can be coordinated between request queues, or can be uncoordinated. For instance, dequeuing can be carried out in an order (e.g., round robin), can give priority to request queues 1150 with larger numbers of requests, can give priority to queues with older requests (or requests which are closer to timing out), can give priority to queues based on a particular session, client, or other privilege type associated with the queue, or can use other criteria, or a combination of criteria, for selecting a queue from which to dequeue.

The database environment 1100 can include more or fewer components than shown, and may be organized in other manners. For example, functionality of a particular component can be carried out by another component. In addition, in at least some cases, functionality can be carried out using multiple components. For example, at least certain functionality of the session manager 1122 and the query language processor 1138 can be distributed in a different manner than shown.

Example 5

Dynamic Admission Control for Database Requests

Figure 12:
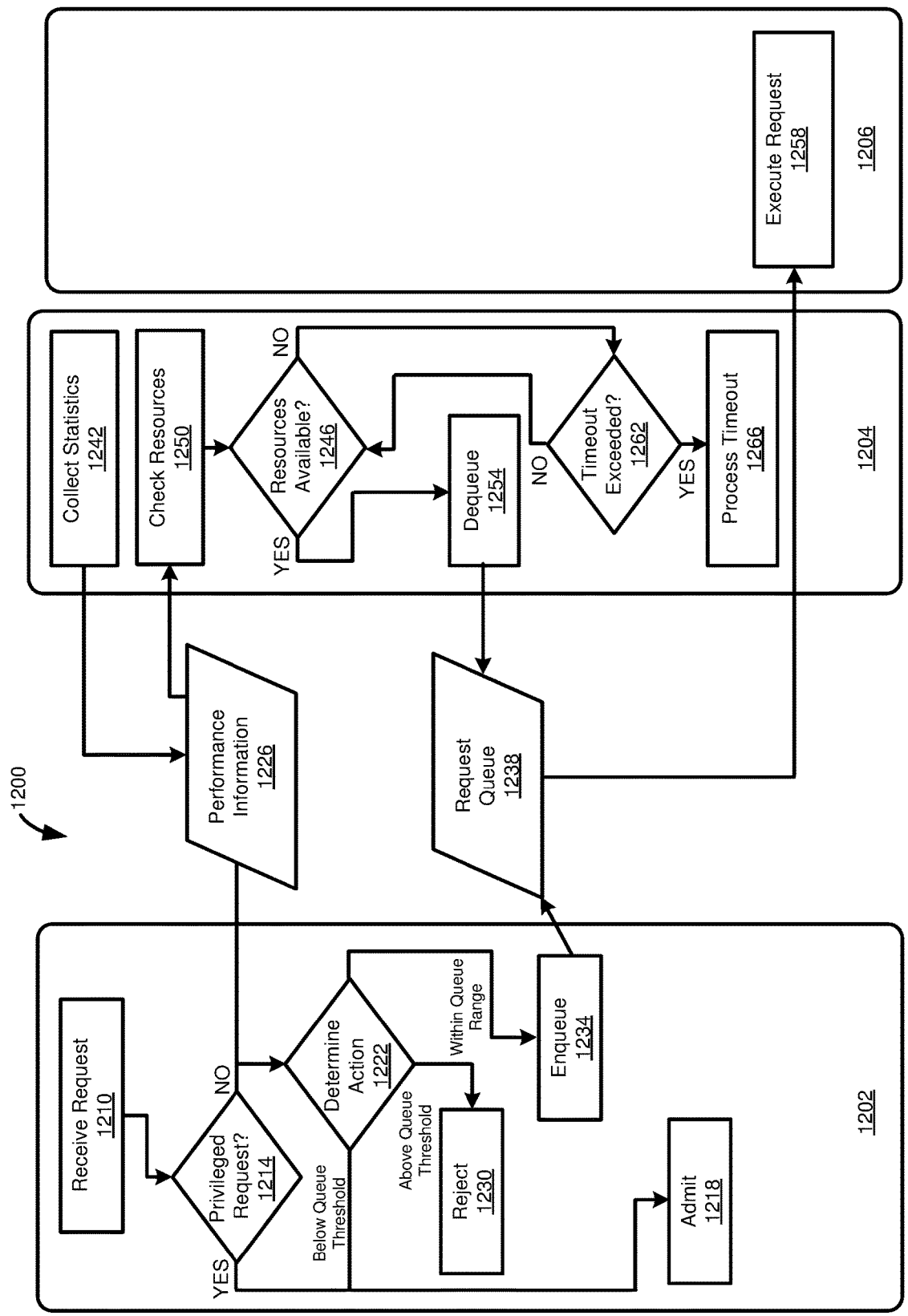
FIG. 12 is a diagram depicting the flow of operations at a query language processor, a listener component, and a job executor during dynamic admission control for requests for database operations.

FIG. 12 illustrates operations 1200 that can be carried out by a query language processor 1202, a listener component 1204, and a job executor 1206 in an embodiment of the present disclosure for processing a database request from a database client. The query language processor 1202, listener component 1204, and job executor 1206 can be, or can be analogous to, the query language processor 1138, the listener component 1134, and the job executor 1170 of FIG. 11.

The query language processor 1202 receives a request at 1210. For example, the request can be assigned to a thread (e.g., a thread from the pool 1162). At 1214, the query language processor determines whether the request is a privileged request, or otherwise is not subject to queuing or deferred execution. A request can be privileged based on its type, or its association with a particular database client (e.g., a preferred client or an administrator, where a preferred status can be stored in session information, such as session information 1126).

Requests can be prioritized by type based on their importance to the database system 1110. For instance OLTP requests, including simple read requests/queries and DML statements, can be routed for immediate processing to ensure that the database system 1110 is up to date. Absent other considerations, longer running queries, such as for reporting and analysis purposes, including OLAP queries, or batch update operations, may not be prioritized and may be subject to further analysis to determine whether the request should be immediately processed, queued, or, in some cases, refused or rejected.

Example of requests that are privileged because of their type can include transaction control statements, such as to commit or roll back a transaction. Other requests that can be privileged because of their type can include statements that release resources, or reduce resource consumption. Such statements can include DDL statements, such as to drop a table or index, a statement to close a result set (which can release locks, for example), a request to disconnect a session, or a request to close a statement or cursor.

If, at 1214, the request is determined to be privileged, it can be admitted for further processing at 1218. As explain above, in at least some implementations, being admitted for processing at 1218 can include analyzing the request using another dispatching protocol, such as the protocol of Example 3. If, at 1214, the request is determined not to be privileged, the operations 1200 proceed to 1222 where it is determined how the request should be processed.

Determining how the request should be processed at 1222 can include analyzing performance information 1226, including a summary or analysis of performance information (e.g., an aggregation, including using an averaging or weighting). Performance information 1226 can reflect the current, or recent, resource use of the database system. Performance information can include a current level of available CPU time, available memory, disk controller time, network bandwidth, and the like. In some cases, performance information can be for the entire database system, while in other cases information can be for a particular process (or collection of processes) running on the database system, such as processes for a particular database system index server.

Determining how the request should be processed at 1222 can include comparing the performance information 1226 to a queuing threshold, where, if the performance information indicates that system resources use is below the queuing threshold (or available resources are above the queuing threshold), the request is admitted for processing at 1218. If the resource use is above the queueing threshold (or available resources are below the queuing threshold), the performance information 1226 can be further compared with a rejection threshold. If the resource use is above the rejection threshold (or available resources are below the rejection threshold), the request can be rejected at 1230. Being rejected at 1230 can include sending a "server busy" message to the requesting database client. After rejection at 1230, the thread for the request can be released.

If, at 1222, it is determined that the resource use is below the rejection threshold (or available resources are above the rejection threshold), and the resource use is also above the queuing threshold (or available resources are below the queuing threshold), the request is enqueued (e.g., by the queue manager 1146) in a request queue 1238 (e.g., the request queue 1150) at 1234. In some cases, enqueuing at 1234 can involve simply adding the request to the tail of the request queue 1238. In other cases, enqueuing at 1234 can involve one or more ordering considerations, such as enqueuing a request considering a priority value (e.g., the request queue 1238 is a priority queue), or considering a timeout value associated with the request (e.g., prioritizing requests having a shorter timeout value).

Turning to the listener component 1204, the listener component, at 1242, can periodically (e.g., at an interval, which can be static or dynamic, in various implementations) collect performance statistics and update the performance information 1226. Periodically, such as at a dequeuing interval, the listener component, at 1246, can determine whether sufficient resources are available to execute a process in the request queue 1238. The dequeuing interval, in some cases, can be set value specified for a database system. In other cases, the dequeuing interval can be changed, such as by an administrator, or can dynamically adjust, including based on factors such as the number of incoming or queued requests, the type of incoming or queued requests, the performance information 1226, other factors, or combinations thereof.

In determining whether sufficient resources are available at 1246 to dequeue one or more requests, the listener component 1204 can check available resources at 1250, such as by accessing the performance information 1226. The determining at 1246 can be analogous to the determining at 1222, using the queuing threshold. That is, if the resources used are below the queuing threshold (the resources available are above the queuing threshold), one or more requests can be dequeued from the request queue 1238 at 1254. Once a request is dequeued, it can be sent to the job execution component 1206 where it can be executed at 1258, including being assigned to an available job execution thread (e.g., a thread of the pool 1174).

If, at 1246, it is determined that sufficient resources are not available to dequeue a request, the operations 1200 can proceed to 1262 where it is determined whether a timeout value has been exceeded for any requests in the request queue 1238. When a request is added to the request queue 1238, information can be stored regarding when the request was added, or the request can be associated with a time it was received by the database system (e.g., at 1210). The time when the request was added to the request queue 1238, or received at 1210, can be compared with a current time. If the difference exceeds a system-specified timeout value, or a value specified for the request (e.g., by a database client), a timeout process can be performed at 1266. The timeout process can include returning a message to the database client that the server is busy, or otherwise indicating that the request failed. In a specific case, the message associated with a query timeout can be returned to the database client (e.g., "execution aborted by timeout"). If the timeout value was not exceeded, the operations 1200 can return to 1246 after the next dequeue interval.

It should be appreciated that FIG. 12 illustrates basic operations 1200, and that various changes and additions may be made to the operations without departing from the scope of the presently disclosed innovations. In particular, decision 1246 was described as analyzing whether a single request could be dequeued. In some implementations, the database system, such as the listener component 1204 can estimate (such as using session information 1126 or query plan statistics 1158) whether sufficient system resources will be available after dequeuing a first request to dequeue one or more additional requests. This process can be repeated until the listener component 1204 determines that dequeuing an additional request will cause the utilization of system resources to exceed a threshold.

In yet further cases, rather than dequeuing a single request when system resources are available, a plurality of requests can be dequeued after system resources have been determined to be available after a dequeue interval. In some cases, the number of requests to be dequeued can be a fixed number (optionally configurable) for the database system. In other cases, the number of request to dequeue (including zero or one request) can be correlated with the availability of system resource (e.g., larger numbers of items are dequeued as increasing amounts of system resources are available).

Another modification that can be made to the operations 1200 is, in determining whether resources are available to dequeue one or more requests 1246, traversing the queue to determine whether a request in the request queue 1238 can be satisfied using presently available resources. The database system, such as the listener component 1204, can estimate (such as using session information 1126 or query plan statistics 1158) whether sufficient system resources are available to process the request at the head of the request queue 1238. If the available system resources are not sufficient to process the request at the head of the request queue 1238, the request queue can be traversed towards the tail, and the first request that can be satisfied with the available resources can be dequeued at 1254.

In some cases, the listener component 1204 can carry out additional functions. For instance, the listener component 1204 can periodically reorder the request queue 1238, including as part of determining whether resources are available at 1246, dequeuing a request at 1254, determining whether a timeout value has been exceeded at 1262, or at another time. In a specific example, the listener component 1204 can reorder at least a portion of the request queue 1238 based on an amount of time remaining before each request times out. In some cases, the reordering can preempt other ordering criteria (such as based on the priority associated with a database client that sent the request), while in other cases, the reordering does not preempt other ordering criteria.

In some cases, the request queue 1238 can have a fixed size. In such cases, the query language processor 1202 may be unable to enqueue requests at 1234 until there is room in the queue, which may result in a higher number of requests being rejected at 1230. However, there may be requests in the request queue 1238 which have timed out. Accordingly, rather than analyzing only the request at the head of the request queue 1238 at 1262, the listener component 1204 can traverse a larger number of elements of the queue, including the entire queue, and dequeue all requests that are determined to have timed out. The timeouts for such requests can be processed at 1266. Thus, 1262 can serve a garbage collection function and help ensure there is room in the request queue 1238 for new requests to be enqueued at 1234. In other cases, the queue can have a dynamic size, such as increasing in size when the queue becomes full.

Example 6

Dynamic Admission Control for Database Requests

Figure 13:
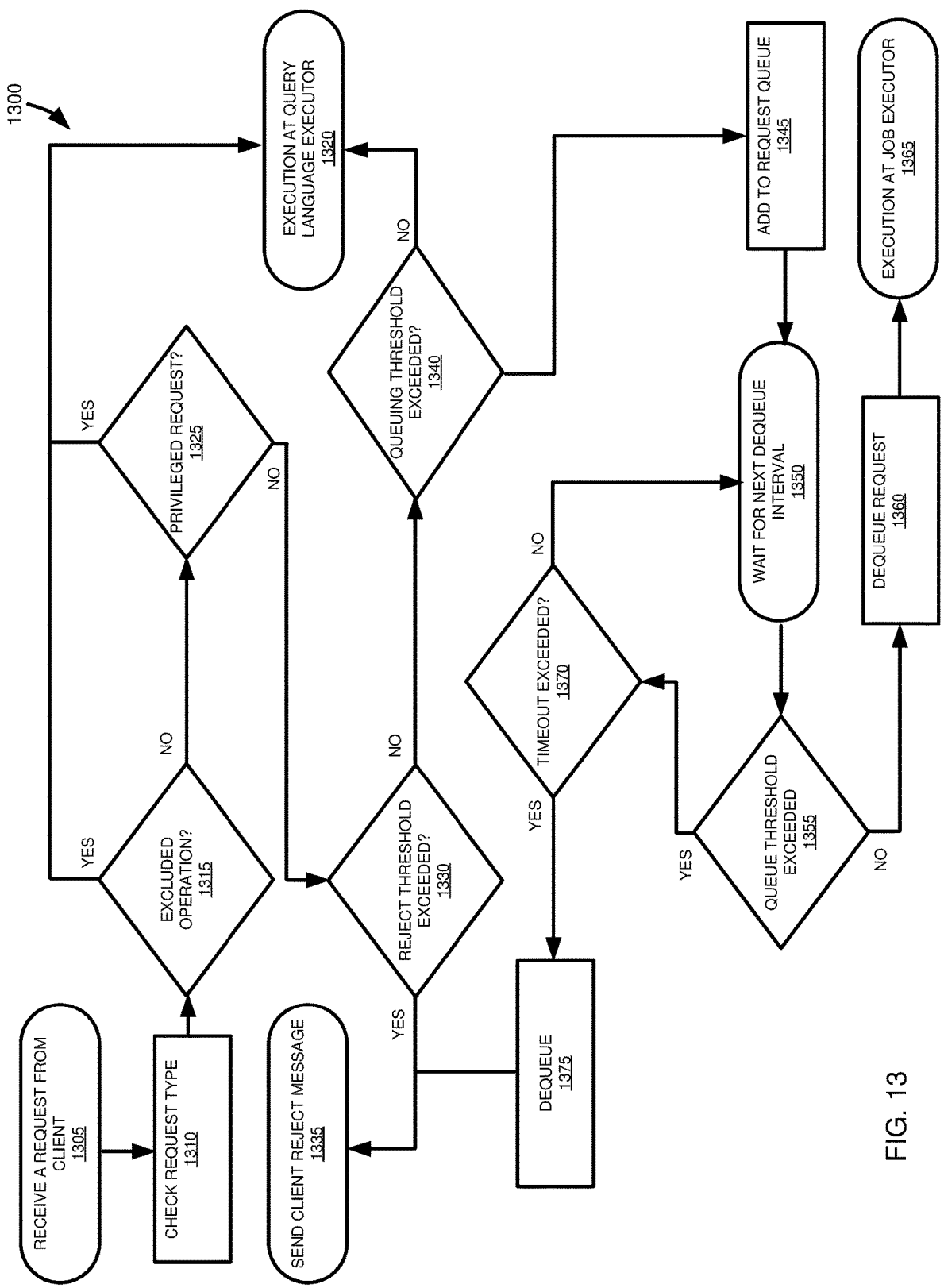
FIG. 13 is a flowchart of operations occurring in a disclosed method for carrying out dynamic admission control for requests for database operations.

FIG. 13 illustrates operations 1300 according to a disclosed method for dynamic admission control of requests for database operations (e.g., SQL statements, such as queries and DML statements). A request is received from a database client at 1305. The request type is checked at 1310. At 1315, it is determined whether the request type corresponds to a type that is excluded from admission control. Operations that can be excluded from admission control include transaction control statements (e.g., to abort or rollback a transaction), DML statements, and simple queries (e.g., associated with OLTP requests). Operations that are excluded from admission control processing can include more, fewer, or different types of operations. Generally, excluded operations include those that are short-running or high priority (e.g., OLTP requests, including DML statements and short queries) or operations that are associated with the release of system resources (e.g., requests to disconnect from the database system, to drop a table or index, to close a result set, release locks, close a cursor, etc.).

If the request type is determined at 1315 to be an excluded operation type, the request is further processed by the query language executor (e.g., by a thread of the query language executor, including a currently assigned thread) at 1320. In some cases, the further processing at 1320 can be processing according to standard database operations (e.g., carrying out the operations associated with the request). In other cases, the further processing at 1320 can include applying an additional dispatching or workload management protocol to the request, such as the protocol of Example 3.

If the request type is determined at 1315 not to be an excluded operation type, at 1325 it is determined whether the request is associated with a privileged database client. A privileged database client may be, for example, a session associated with a database administrator or similarly privileged account. In other cases, different database clients (e.g. for different end users for a company, or for different companies having different service levels) can have different priorities even if the different clients are not associated with administrative privileges. If, at 1325 it is determined that the request is associated with a privileged client or session, the request can be sent for further processing by the query language processor at 1320, as described above.

If the request is not determined at 1325 to be associated with a privileged client or session, it is determined at 1330 whether an amount of one or more system resources in use is greater than or equal to a rejection threshold value (or the free resources are less than a threshold value). If the amount of resources in use is greater than or equal to the threshold value (e.g., the threshold is exceeded), the request is rejected and the database client is sent a rejection message (e.g., "server busy") at 1335.

If the rejection threshold was not exceeded at 1330, the amount of system resources is compared with a queueing (or deferred execution) threshold at 1340. If the amount of system resources in use is less than the queuing threshold (or the amount of available resources is greater than or equal to the queuing threshold), the system can be determined to have sufficient resources to process the request, which is then further processed by the query language processor at 1320, as described above.

If the query threshold was determined at 1340 to have been exceeded, the request can be added to a request queue at 1345. At 1350, the operations 1300 wait for the expiration of a dequeue interval. After the passage of the dequeue interval, at 1355, it is determined whether an amount of system resources in use exceeds the queuing threshold (which is typically the same threshold used at 1340, although, in some cases, the queueing thresholds can be different). If the amount of system resources in use is less than the queuing threshold, the request can be dequeued at 1360 and send to a job executor to be executed at 1365.

If it is determined at 1355 that the amount of system resources in use is greater than or equal to the queueing threshold, it can be determined at 1370 whether a timeout value for the request has been exceeded. In some cases, the timeout value can be a value specified for the request (such as by a database client). In other cases, the timeout value can be a default, system value. The timeout value can represent a maximum time from when the request was enqueued (or received) and a current time. If the time between when the request was enqueued (or received) and the current time is greater than the timeout value, the request can be dequeued at 1375 and the database client which sent the request can be sent a timeout notification at 1335. If it is determined at 1370 that the timeout value has not been exceeded, the operations 1300 can return to 1350 and await the passage of the next dequeue interval.

The disclosed innovations have described how some requests, such as requests associated with a particular type of database client or session (e.g., a privileged database client or session, including an administrator or a session associated with a database client for which a higher service level is provided) or a particular operation type (e.g., transaction control statement) can be exempt from other aspects of the described admission control, such as described with respect to decisions 1315, 1325. In further cases, different classes of database clients and sessions and/or operation types can be associated with different thresholds, such as the rejection threshold applied at 1330, the queuing threshold applied at 1340, the queuing threshold applied at 1355, and the timeout determination of 1370. These different classes, which can be referred to as workload classes, can also be associated with different system-supplied default timeout values. In some cases, different workload classes can be assigned to different queues, and the different queues can have different dequeuing criteria, including having more or fewer items being dequeued at each dequeue interval.

Generally, more privileged workload types can be associated with longer timeout values, larger queues, and having thresholds that make it more likely a request will be executed than queued, more likely to be queued than rejected, and requiring less resources to be free before the request can be dequeued. In a specific implementation, different sessions (or database clients) can be mapped to a specific workload class, where the workload class specifies parameters for used in an admission control process (e.g., the thresholds/timeout values).

The disclosed innovations can provide for the monitoring of the admission control process (including the operations 1300). For instance, a database system may collect, and make available (such as to a database administrator), information regarding the total number of admitted requests, the total number of queued requests, the total number of queued requests, the total number of dequeued request, the number of requests that timed out, the current number of queued requests, and information regarding system resource use.

Example 7

Dynamic Admission Control for Database Requests

Figure 14A:
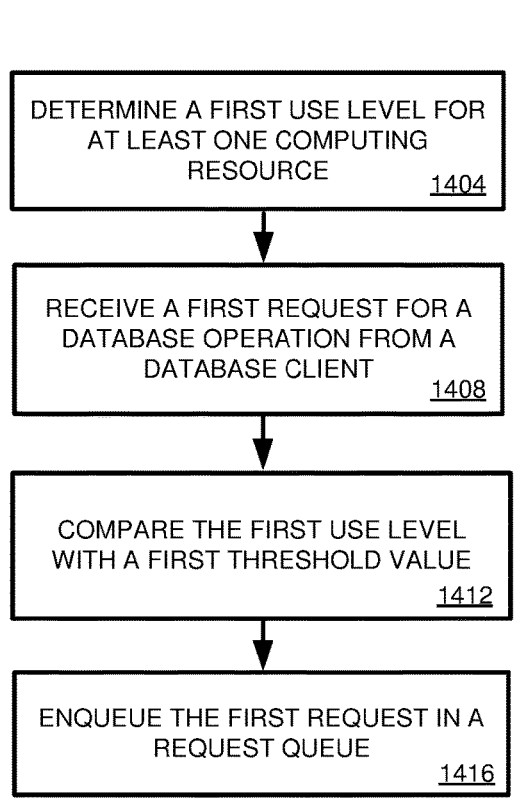
FIGS. 14A-14C are flowcharts of operations occurring in various disclosed methods for carrying out dynamic admission control for requests for database operations.
Figure 14B:
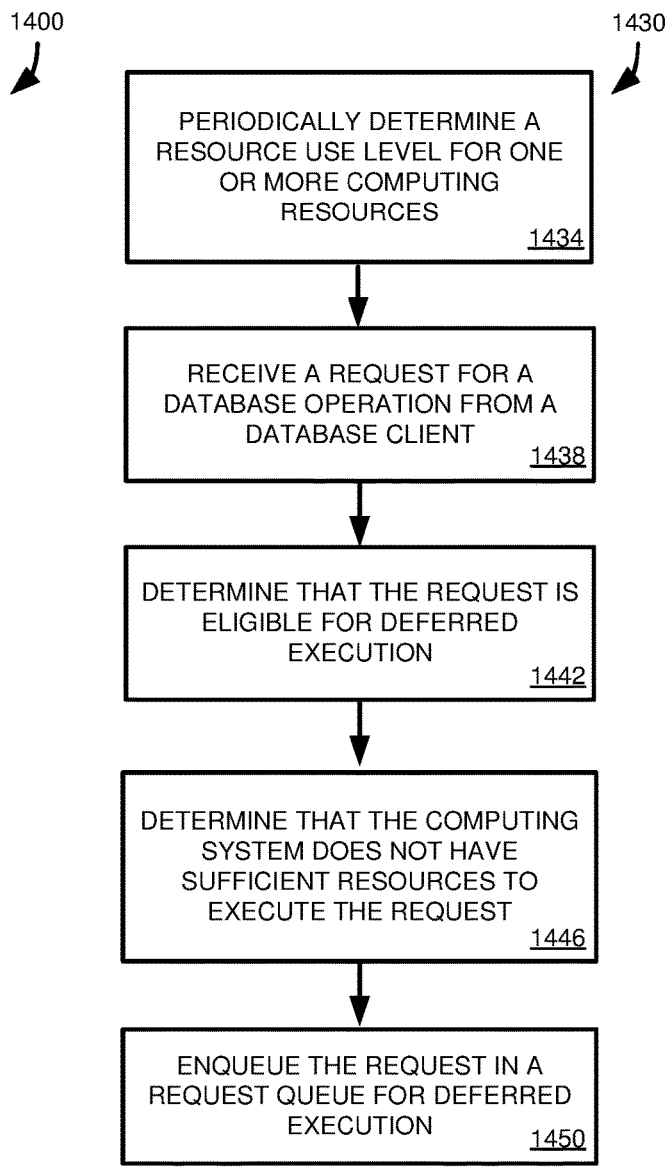
Figure 14C:
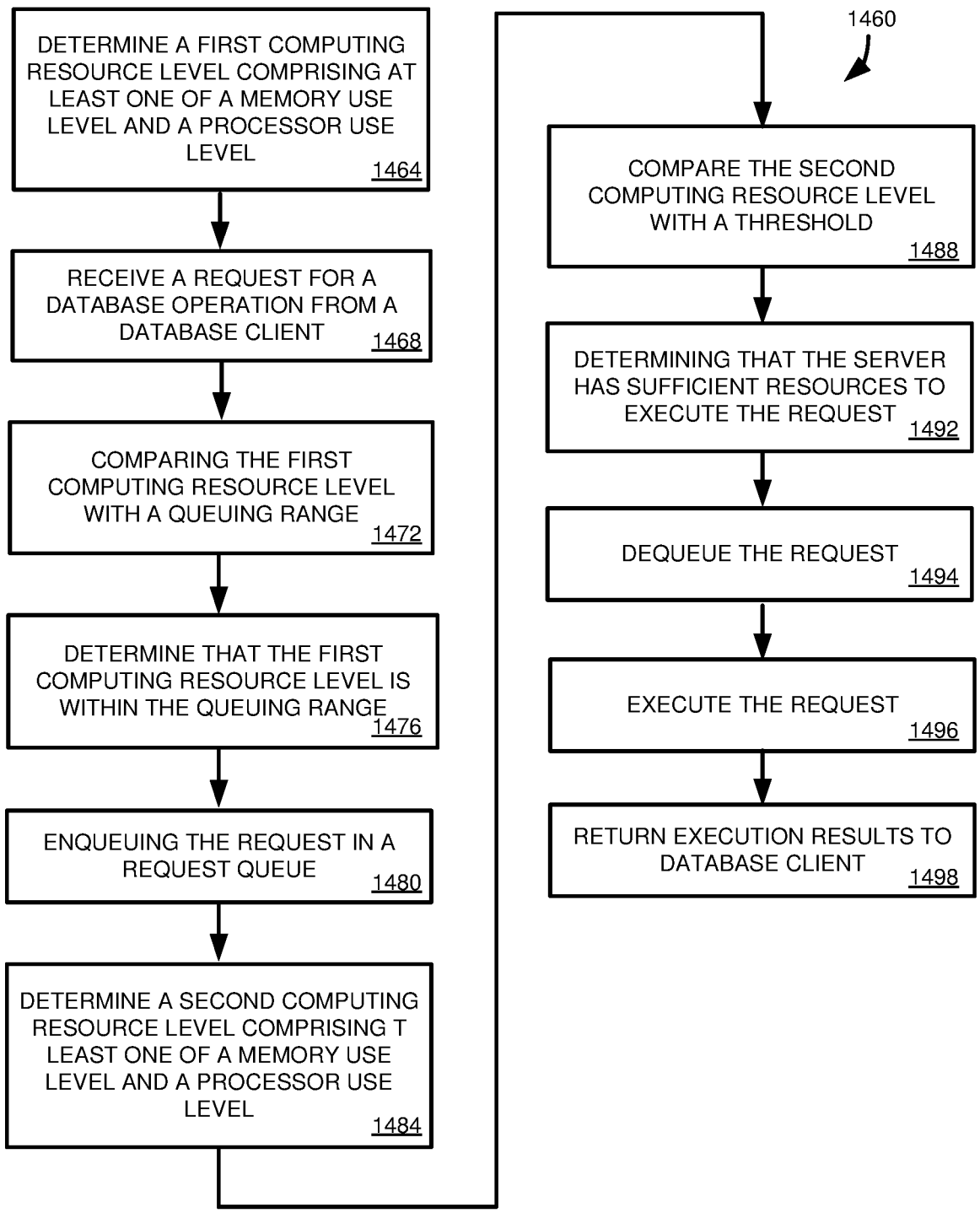

FIGS. 14A, 14B, and 14C illustrate operations 1400, 1430, 1460, respectively, occurring at a database system, or a node of a database system, in various embodiments that incorporate one or more disclosed innovations. The operations 1400, 1430, 1460 can be carried out, for example, using the components of the database system 1110 of FIG. 11 (and the environment 100 of FIG. 1).

Referring first to FIG. 14A, operations 1400 include determining a first use level for at least one computing resource at 1404. The first use level can represent a level of resource use at a particular time, or can represent a value calculated at a particular time that represents use over a period of time, such as a moving average. The use level can be for a particular computing resource, or can represent resource use of a combination of different computing resources, including a weighted combination of such resources.

At 1408, a first request for a database operation is received from a database client. The first use level is compared with a first threshold value at 1412. The first request is enqueued in a request queue at 1416. For example, the first request can be enqueued if it is determined, such as from the comparing at 1412, that the database system does not have sufficient resources to execute the request. In some cases, determining that the database system does not have sufficient resources to execute the request can include determining that the first use level (indicating resources in use) is greater than, or greater than or equal to, the threshold value. In other cases, determining that the database system does not have sufficient resources to execute the request can include determining that the first use level (which indicates available resources) is less than, or less than or equal to, the threshold value.

According to the operations 1430 of FIG. 14B, a resource use level for one or more computing resources is periodically determined. The resource use level can represent a level of resource use at a particular time, or can represent a value calculated at a particular time that represents use over a period of time, such as a moving average. The use level can be for a particular computing resource, or can represent resource use of a combination of different computing resources, including a weighted combination of such resources.

At 1438, a request for a database operation is received from a database client. It is determined at 1442 that the request is eligible for deferred execution. For instance, it can be determined that the request does not include an operation that is to be processed immediately, and not deferred, and/or that the request is not associated with a privileged database client or database session. At 1446, it is determined that the computing system does not have sufficient resources to execute the request, such as by comparing the resource use level to a threshold value, which can be carried out in a manner analogous to that described with respect to FIG. 14A. The request is enqueued in a request queue for deferred execution at 1450.

Referring to FIG. 14C, the operations 1460 include determining a first computing resource level at 1464. The first computing resource level include at least one of a memory use level and a processor use level. The resource level can represent a level of resource use at a particular time, or can represent a value calculated at a particular time that represents use over a period of time, such as a moving average. The use level can be for a particular computing resource, or can represent resource use of a combination of different computing resources, including a weighted combination of such resources.

A request for a database operation is received from a database client at 1468. At 1472, the first computing resource level is compared with a queuing range. The queuing range can specify a range of resource levels at which at least certain incoming requests for database operations will be enqueued in a request queue for deferred execution. In some cases, if the resource level is less than a minimum value of the queuing range, the request can be immediately executed. In further cases, if the resource level is greater than a maximum value of the queuing range, the request is not executed, and a corresponding message can be returned to the database client.

It is determined at 1476 that the first computing resource level is within the queuing range. The request is enqueued in the request queue at 1480. A second computing resource level, including at least one of a memory use level and a processor use level, is determined at 1484. The determining can be carried out in an analogous manner to 1464.

At 1488, the second computing resource level is compared with a threshold value. In some cases the threshold value can be a minimum value of the queuing range. In other cases, the threshold value can be a different value. The comparing can be carried out in an analogous manner to 1412. It is determined at 1492 that the computing system has sufficient resources to execute the request. The request is dequeued at 1494 and executed at 1496. Execution results are returned to the database client at 1498.

Example 8

Computing Systems

Figure 15:
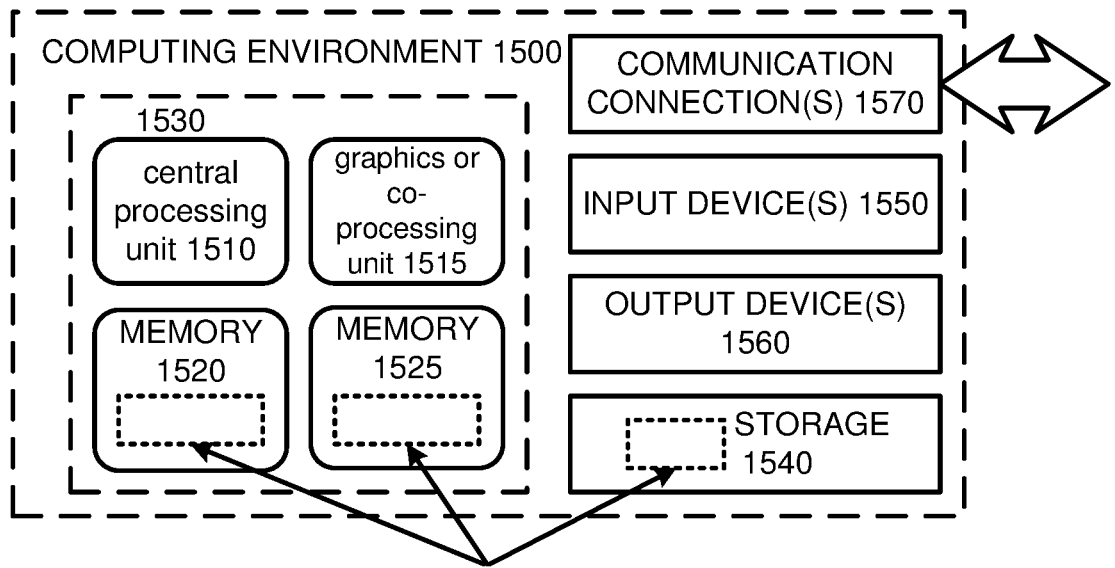
FIG. 15 is a diagram of an example computing system in which some described embodiments can be implemented.

FIG. 15 depicts a generalized example of a suitable computing system 1500 in which the described innovations may be implemented. The computing system 1500 is not intended to suggest any limitation as to scope of use or functionality of the present disclosure, as the innovations may be implemented in diverse general-purpose or special-purpose computing systems.

With reference to FIG. 15, the computing system 1500 includes one or more processing units 1510, 1515 and memory 1520, 1525. In FIG. 15, this basic configuration 1530 is included within a dashed line. The processing units 1510, 1515 execute computer-executable instructions, such as for implementing a database environment, and associated methods, described in Examples 1-7. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s) 1510, 1515. The memory 1520, 1525 stores software 1580 implementing one or more innovations described herein, in the form of computer-executable instructions suitable for execution by the processing unit(s) 1510, 1515. The memory 1520, 1525, may also store database data, such as data in the row store 162 or the column store 164 of FIG. 1.

A computing system 1500 may have additional features. For example, the computing system 1500 includes storage 1540 (such as for storing persisted data 172 of FIG. 1), one or more input devices 1550, one or more output devices 1560, and one or more communication connections 1570. An interconnection mechanism (not shown) such as a bus, controller, or network interconnects the components of the computing system 1500. Typically, operating system software (not shown) provides an operating environment for other software executing in the computing system 1500, and coordinates activities of the components of the computing system 1500. In some cases, the operating system can manage, or assist in managing, query language execution threads or job execution threads.

The tangible storage 1540 may be removable or non-removable, and includes magnetic disks, magnetic tapes or cassettes, CD-ROMs, DVDs, or any other medium which can be used to store information in a non-transitory way and which can be accessed within the computing system 1500. The storage 1540 stores instructions for the software 1520 implementing one or more innovations described herein.

The input device(s) 1550 may be a touch input device such as a keyboard, mouse, pen, or trackball, a voice input device, a scanning device, or another device that provides input to the computing system 1500. The output device(s) 1560 may be a display, printer, speaker, CD-writer, or another device that provides output from the computing system 1500.

The communication connection(s) 1570 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9

Cloud Computing Environment

Figure 16:
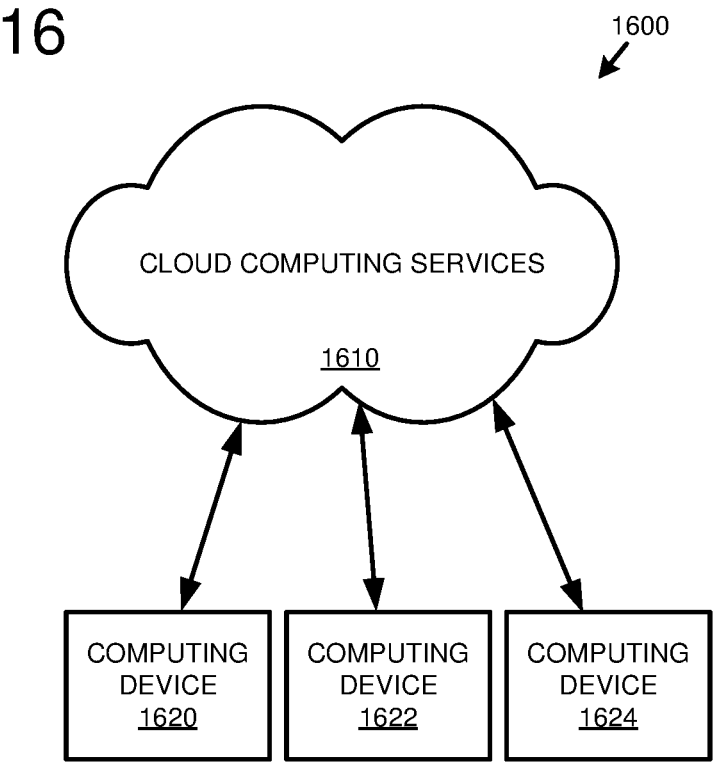
FIG. 16 is an example cloud computing environment that can be used in conjunction with the technologies described herein.

FIG. 16 depicts an example cloud computing environment 1600 in which the described technologies can be implemented. The cloud computing environment 1600 comprises cloud computing services 1610. The cloud computing services 1610 can comprise various types of cloud computing resources, such as computer servers, data storage repositories, networking resources, etc. The cloud computing services 1610 can be centrally located (e.g., provided by a data center of a business or organization) or distributed (e.g., provided by various computing resources located at different locations, such as different data centers and/or located in different cities or countries).

The cloud computing services 1610 are utilized by various types of computing devices (e.g., client computing devices), such as computing devices 1620, 1622, and 1624. For example, the computing devices (e.g., 1620, 1622, and 1624) can be computers (e.g., desktop or laptop computers), mobile devices (e.g., tablet computers or smart phones), or other types of computing devices. For example, the computing devices (e.g., 1620, 1622, and 1624) can utilize the cloud computing services 1610 to perform computing operators (e.g., data processing, data storage, and the like).

Example 10

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 15, computer-readable storage media include memory 1520 and 1525, and storage 1540. The term computer-readable storage media does not include signals and carrier waves. In addition, the term computer-readable storage media does not include communication connections (e.g., 1570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   at least one hardware processor coupled to the at least one memory; and
   one or more computer-readable storage media storing instructions that, when executed, cause the computing system to perform operations comprising:
   determining a first use level for at least one computing resource;
   receiving a first request for a database operation from a first database client, wherein the first request for a database operation is received in a declarative query language;
   in response to the receiving the first request for a database operation, comparing the first use level with a first threshold, wherein the first threshold determines, at least in part, whether the at least one computing resource is sufficient to process the first request for a database operation;
   determining that the first use level does not satisfy the first threshold, and therefore the first use level of the at least one computing resource is not sufficient to process the first request for a database operation;
   in response to the determining that the first use level does not satisfy the first threshold, enqueuing the first request for a database operation in a queue, the queue comprising a data structure physically embodied in the at least one memory;
   at a time after the enqueuing of the first request for a database operation, determining a second use level for the at least one computing resource;
   comparing the second use level to a second threshold, wherein (1) the second threshold is the same as the first threshold or is different than the first threshold; and (2) the second threshold determines, at least in part, whether the at least one computing resource is sufficient to process the first request for a database operation;
   determining that the second use level satisfies the second threshold, and thus the second use level of the at least one computing resource is sufficient to process the first request for a database operation;
   at least in part in response to the determining that the second use level satisfies the second threshold, dequeuing the first request for a database operation from the queue for execution by a first execution component comprising a first pool of a first plurality of execution threads;
   after dequeuing the first request for a database operation from the queue, determining a query plan useable to execute the first request for a database operation, the query plan comprising a plurality of executable operations generated from declarative commands specified in the first request for a database operation;
   executing the plurality of executable operations at least in part using the first execution component;
   returning to the first database client execution results obtained from the executing the plurality of executable operations;
   receiving a second request for a database operation from a second database client, where the second database client is the first database client or is a database client other than the first database client, wherein the second request for a database operation is received in the declarative query language;
   in response to the receiving the second request for a database operation, comparing a third use level for the at least one computing resource with the first threshold;
   determining that the third use level satisfies the first threshold, and thus that the third use level of the at least one computing resource is sufficient to process the second request for a database operation; and
   in response to the determining that the third use level satisfies the first threshold, without enqueuing the second request for a database operation in the queue, causing the second request for a database operation to be executed by a second execution component comprising a second thread pool of a second plurality of execution threads, the second thread pool being different than the first thread pool.

2. The computing system of claim 1, wherein the first use level represents an amount of the at least one computing resource being used and the comparing comprises determining that the first use level is higher than a value of the first threshold.

3. The computing system of claim 1, wherein the first use level comprises a moving average of resource use values over a time period.

4. The computing system of claim 1, wherein the enqueuing is carried out if the first use level is greater than, or greater than or equal to, a value of the first threshold, where the first use level represents an amount of the at least one computing resource that is in use.

5. The computing system of claim 1, wherein the enqueuing is carried out if the first use level is less than, or less than or equal to, a value of the first threshold, where the first use level represents an amount of the at least one computing resource that is available for use.

6. The computing system of claim 1, wherein the determining the second use level and the comparing the second use level are carried out after each passing of a dequeue interval.

7. The computing system of claim 1, wherein the second use level represents an amount of the at least one computing resource that is in use, the comparing the second use level to a second threshold comprises determining that the second use level is greater than, or greater than or equal to, a second threshold value of the second threshold, and the operations further comprise:
- determining a duration the first request for a database operation has been pending;
- comparing the duration with a third threshold;
- determining that the duration meets, or meets or exceeds, the third threshold;
- dequeuing the first request for a database operation from the queue; and
- sending a message to the first database client that the first request for a database operation was not executed.

8. The computing system of claim 1, the operations further comprising:
- determining an estimated amount of the at least one computing resource needed to execute the first request for a database operation;
- comparing the estimated amount of the at least one computing resource with an available amount of the at least one computing resource based on the second use level; and
- determining that a sufficient amount of the at least one computing resource is available to execute the first request for a database operation, wherein the dequeuing the first request for a database operation is based at least on part on the determining that a sufficient amount of the at least one computing resource is available to execute the first request for a database operation.

9. The computing system of claim 1, the operations further comprising, after the enqueueing the first request for a database operation:
- determining a fourth use level for the at least one computing resource;
- receiving a third request for a database operation from a second database client, where the second database client is the first database client or is a database client other than the first database client;
- comparing the fourth use level with the first threshold;
- determining that the fourth use level does not satisfy the first threshold; and
- sending a message to the second database client that the third request for a database operation was not executed.

10. The computing system of claim 1, wherein the queue comprises a plurality of requests for a database operation and the operations further comprise, for at least a portion of the plurality of requests for a database operation, for a given request for a database operation of the plurality of requests for a database operation:
- determining a time the given request for a database operation has been pending;
- comparing the time the given request for a database operation has been pending with a third threshold;
- determining that the given request for a database operation has been pending for a time greater than, or greater than or equal to, a value of the third threshold;
- dequeuing the given request for a database operation from the queue; and
- notifying a database client associated with the dequeued given request for a database operation that the given request for a database operation was not executed.

11. The computing of claim 10, wherein a value of the third threshold is specified by the given request for a database operation.

12. The computing system of claim 10, wherein a value of the third threshold comprises a default value.

13. The computing system of claim 1, wherein the second threshold is based at least in part on an estimated amount of the at least one computing resource needed to execute the first request for a database operation.

14. The computing system of claim 9, the operations further comprising:
- after the determining that the second use level does not satisfy the first threshold, determining that the queue is full.

15. The computing system of claim 1, wherein the first data request for a database operation is enqueued as it was received from the first database client.

16. The computing system of claim 1, wherein the first request for a database operation is enqueued without a specification of operations to be executed in carrying out declarative commands in the first request for a database operation.

17. A method, implemented in a computing system comprising at least one hardware processor and at least one memory coupled to the at least one hardware processor, the method comprising:
- determining a first use level for at least one computing resource;
- receiving a first request for a database operation from a first database client, wherein the first request for a database operation is received in a declarative query language;
- in response to the receiving the first request for a database operation, comparing the first use level with a first threshold, wherein the first threshold determines, at least in part, whether the at least one computing resource is sufficient to process the first request for a database operation;
- determining that the first use level does not satisfy the first threshold, and therefore the first use level of the at least one computing resource is not sufficient to process the first request for a database operation;
- in response to the determining that the first use level does not satisfy the first threshold, enqueuing the first request for a database operation in a queue, the queue comprising a data structure physically embodied in the at least one memory;

at a time after the enqueuing of the first request for a database operation, determining a second use level for the at least one computing resource;

comparing the second use level to a second threshold, wherein (1) the second threshold is the same as the first threshold or is different than the first threshold; and (2) the second threshold determines, at least in part, whether the at least one computing resource is sufficient to process the first request for a database operation;

determining that the second use level satisfies the second threshold, and thus the second use level of the at least one computing resource is sufficient to process the first request for a database operation;

at least in part in response to the determining that the second use level satisfies the second threshold, dequeuing the first request for a database operation from the queue for execution by a first execution component comprising a first pool of a first plurality of execution threads;

after dequeuing the first request for a database operation from the queue, determining a query plan useable to execute the first request for a database operation, the query plan comprising a plurality of executable operations generated from declarative commands specified in the first request for a database operation;

executing the plurality of executable operations at least in part using the first execution component;

returning to the first database client execution results obtained from the executing the plurality of executable operations;

receiving a second request for a database operation from a second database client, where the second database client is the first database client or is a database client other than the first database client, wherein the second request for a database operation is received in the declarative query language;

in response to the receiving the second request for a database operation, comparing a third use level for the at least one computing resource with the first threshold;

determining that the third use level satisfies the first threshold, and thus that the third use level of the at least one computing resource is sufficient to process the second request for a database operation; and in response to the determining that the third use level satisfies the first threshold, without enqueuing the second request for a database operation in the queue, causing the second request for a database operation to be executed by a second execution component comprising a second thread pool of a second plurality of execution threads, the second thread pool being different than the first thread pool.

18. The method of claim 17, wherein the first request for a database operation is enqueued as it was received from the first database client and is enqueued without a specification of operations to be executed in carrying out declarative commands in the request for a database operation.

19. One or more computer-readable storage media comprising:

computer-executable instructions that, when executed by a computing system comprising at least one hardware processor and at least one memory coupled to the at least one hardware processor, cause the computing system to determine a first use level for at least one computing resource;

computer-executable instructions that, when executed by the computing system, cause the computing system to receive a first request for a database operation from a first database client, wherein the first request for a database operation is received in a declarative query language;

computer-executable instructions that, when executed by the computing system, cause the computing system to, in response to the receiving the first request for a database operation, compare the first use level with a first threshold, wherein the first threshold determines, at least in part, whether the at least one computing resource is sufficient to process the first request for a database operation;

computer-executable instructions that, when executed by the computing system, cause the computing system to determine that the first use level does not satisfy the first threshold, and therefore the first use level of the at least one computing resource is not sufficient to process the first request for a database operation;

computer-executable instructions that, when executed by the computing system, cause the computing system to, in response to the determining that the first use level does not satisfy the first threshold, enqueue the first request for a database operation in a queue, the queue comprising a data structure physically embodied in the at least one memory;

computer-executable instructions that, when executed by the computing system, cause the computing system to, at a time after the enqueuing of the first request for a database operation, determine a second use level for the at least one computing resource;

computer-executable instructions that, when executed by the computing system, cause the computing system to compare the second use level to a second threshold, wherein (1) the second threshold is the same as the first threshold or is different than the first threshold; and (2) the second threshold determines, at least in part, whether the at least one computing resource is sufficient to process the first request for a database operation;

computer-executable instructions that, when executed by the computing system, cause the computing system to determine that the second use level satisfies the second threshold, and thus the second use level of the at least one computing resource is sufficient to process the first request for a database operation;

computer-executable instructions that, when executed by the computing system, cause the computing system to, at least in part in response to the determining that the second use level satisfies the second threshold, dequeue the first request for a database operation from the queue for execution by a first execution component comprising a first pool of a first plurality of execution threads;

computer-executable instructions that, when executed by the computing system, cause the computing system to, after dequeuing the first request for a database operation from the queue, determine a query plan useable to execute the first request for a database operation, the query plan comprising a plurality of executable operations generated from declarative commands specified in the first request for a database operation;

computer-executable instructions that, when executed by the computing system, cause the computing system to execute the plurality of executable operations at least in part using the first execution component;

computer-executable instructions that, when executed by the computing system, cause the computing system to return to the first database client execution results obtained from execution of the plurality of executable operations;

computer-executable instructions that, when executed by the computing system, cause the computing system to receive a second request for a database operation from a second database client, where the second database client is the first database client or is a database client other than the first database client, wherein the second request for a database operation is received in the declarative query language;

computer-executable instructions that, when executed by the computing system, cause the computing system to, in response to the receiving the second request for a database operation, compare a third use level for the at least one computing resource with the first threshold;

computer-executable instructions that, when executed by the computing system, cause the computing system to determine that the third use level satisfies the first threshold, and thus that the third use level of the at least one computing resource is sufficient to process the second request for a database operation; and computer-executable instructions that, when executed by the computing system, cause the computing system to, in response to the determining that the third use level satisfies the first threshold, without enqueuing the second request for a database operation in the queue, cause the second request for a database operation to be executed by a second execution component comprising a second thread pool of a second plurality of execution threads, the second thread pool being different than the first thread pool.

20. The one or more computer-readable storage media of claim 19, wherein the first request for a database operation is enqueued as it was received from the first database client and is enqueued without a specification of operations to be executed in carrying out declarative commands in the first request for a database operation.

* * * * *